United States Patent
Wang et al.

(10) Patent No.: US 8,718,199 B2
(45) Date of Patent: May 6, 2014

(54) FREQUENCY-DOMAIN MULTI-STAGE GROUP DETECTION FOR ALLEVIATING INTER-SYMBOL INTERFERENCE

(75) Inventors: Yi-Pin Eric Wang, Fremont, CA (US); Gregory E. Bottomley, Cary, NC (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 355 days.

(21) Appl. No.: 13/050,433

(22) Filed: Mar. 17, 2011

(65) Prior Publication Data

US 2012/0051466 A1    Mar. 1, 2012

Related U.S. Application Data

(60) Provisional application No. 61/378,556, filed on Aug. 31, 2010.

(51) Int. Cl.
    *H04L 27/06*    (2006.01)
(52) U.S. Cl.
    USPC .......................................... 375/340; 375/260
(58) Field of Classification Search
    USPC ................... 375/340, 341, 260, 262
    See application file for complete search history.

(56) References Cited

U.S. PATENT DOCUMENTS

| | | | |
|---|---|---|---|
| 5,757,791 A | 5/1998 | Kanterakis et al. | |
| 8,351,549 B1* | 1/2013 | Choi et al. | 375/341 |
| 2006/0203932 A1 | 9/2006 | Palanki et al. | |
| 2008/0279298 A1 | 11/2008 | Ben-Yishai et al. | |
| 2008/0298491 A1 | 12/2008 | Jung et al. | |
| 2009/0034664 A1* | 2/2009 | Masui et al. | 375/341 |
| 2009/0046772 A1 | 2/2009 | Yu et al. | |

(Continued)

FOREIGN PATENT DOCUMENTS

| | | |
|---|---|---|
| GB | 2 472 906 A | 2/2011 |
| WO | 2008/027554 A2 | 3/2008 |

OTHER PUBLICATIONS

Sari et al, "Frequency-domain equalization of mobile radio and terrestrial broadcast channels" in Proc. IEEE Global Telecommun. Conf., vol. 1, Nov. 1994.

(Continued)

*Primary Examiner* — Aristocratis Fotakis
(74) *Attorney, Agent, or Firm* — Nixon & Vanderhye, P.C.

(57) ABSTRACT

A receiver comprises plural receive antennas and electronic circuitry. The plural receive antennas are configured to receive, on plural subcarriers transmitted over a radio interface, a frequency domain signal that comprises contribution from a block of time domain symbols. The electronic circuitry is configured or operable to perform symbol detection of time domain symbols comprising the block by performing a multi-stage joint detection procedure comprising plural stages, and thus serves as a detector (40). For a first stage the block is divided into a first number of sub-blocks each having a sub-block first size. For a second stage the block is divided into a second number of sub-blocks each having a sub-block second size, the sub-block second size being greater than the sub-block first size. For each stage a detector (40) formulates frequency domain combining weights and uses the frequency domain combining weights for combining multiple receive versions of each subcarrier to provide candidate symbol combination values for symbols in each sub-block of the respective stage. For the second stage the detector (40) is further configured to use the candidate symbol combination values of the first stage to formulate joint hypotheses to serve as candidates for the joint detection operation of the second stage.

26 Claims, 12 Drawing Sheets

(56) References Cited

U.S. PATENT DOCUMENTS

| | | | |
|---|---|---|---|
| 2009/0135964 A1* | 5/2009 | Bahng et al. | 375/341 |
| 2009/0232241 A1 | 9/2009 | Shabany et al. | |
| 2010/0166119 A1* | 7/2010 | Wang et al. | 375/341 |
| 2011/0075767 A1* | 3/2011 | Bottomley et al. | 375/340 |
| 2011/0075769 A1* | 3/2011 | Bottomley | 375/341 |
| 2011/0090893 A1* | 4/2011 | Higuchi et al. | 370/342 |
| 2011/0129042 A1* | 6/2011 | Grant et al. | 375/341 |
| 2011/0129043 A1* | 6/2011 | Grant et al. | 375/341 |

OTHER PUBLICATIONS

Bottomomley et al, "Subblock Equalization and Code Averaging for DS-CMDA Receivers", IEEE Transactions on Vehicular Technology, vol. 59, No. 7, Sep. 2010, pp. 3321-3331.

Berardinelli et al, "Improving SC-FDMA performance by turbo equalization in UTRA LTE uplink" in Proc. IEEE Veh. Technol. Conf. (VTC), Singapore, May 11-14, 2008, pp. 2557-256.

U.S. Appl. No. 13/050,210, filed Mar. 17, 2011, entitled "Symbol Detection for alleviating inter-symbol interference".

U.S. Appl. No. 13/050,433, filed Mar. 17, 2011, entitled "Frequency-Domain Multi-Stage Group Detection for alleviating inter-symbol interference".

U.S. Appl. No. 13/050,697, filed Mar. 17, 2011, entitled "incrementally inclusive frequency domain symbol joint detection".

Riskin, "Optimal bit allocation via the generalized BFOS algorithm," IEEE Trans, Info Thy., vol. 37, pp. 400-402, Mar. 1991.

Soderstrom et al, System Identification, Prentice Hall, 1989.

Choi et al., "Efficient Soft-Input Soft-Output MIMO Detection Via Improved M-Algorithm", Proceedings of 2010 IEEE International Conference on Communications.

Baek et al., "Combined QRD-M and DFE Detection Technique for Simple and Efficient Signal Detection in MIMO-OFDM Systems", IEEE Transactions on Wireless Communications, vol. 8, No. 4, Apr. 2009; pp. 1632-1638.

Jelinek et al., "Instrumental Tree Encoding of Information Sources", IEEE Transactions on Information Theory, Jan. 1971, pp. 118-119.

Anderson et al., "Sequential Coding Algorithms: A Survey and Cost Analysis", IEEE Transactions on Communications, vol. COM-32, No. 2, Feb. 1984, pp. 169-176.

Dai et al, "A Comparative Study of QRD-M Detection and Sphere Decoding for MIMO-OFDM Systems", 2005 IEEE 16th International Symposium on Personal, Indoor and Mobile Radio Communications, 2005, Berlin Germany, Sep. 11-14, 2005, Piscataway, NJ, vol. 1, Sep. 11, 2005, pp. 186-190.

Kimura et al, "Multiple-QR-Decomposition Assisted Group Detection for Reduced-Complexity-and-Latency MIMO-OFDM Receivers", The 17th Annual IEEE International Symposium on Personal, Indoor and Mobile Radio Communications (PIMRC'06), Sep. 1, 2006, pp. 1-5.

Radosavljevic et al, "QRD-QLD Searching Based Sphere Detection for Emerging MIMO Downlink OFDN Receivers", 2008 Global Telecommunications Conference, IEEE GLOBECOM 2008, Piscataway, NJ, Nov. 30, 2008, pp. 1-5.

International Search Report and Written Opinion mailed Dec. 19, 2011 in PCT Application No. PCT/IB2011/053801.

International Search Report and Written Opinion mailed Dec. 27, 2011 in PCT Application No. PCT/IB2011/053798.

International Search Report and Written Opinion mailed Jan. 12, 2012 in PCT Application No. PCT/I2011/053799.

Notice of Allowance mailed Jun. 10, 2013 in U.S. Appl. No. 13/050,697.

Office Action mailed Apr. 25, 2013 in U.S. Appl. No. 13/050,210.

Bottomley et al, "A Novel Multistage Group Detection Technique and Applications", IEEE Transactions on Wireless Communications, vol. 9, No. 8, pp. 2438-2443, Aug. 2010.

Final Office Action mailed Oct. 3, 2013 in U.S. Appl. No. 13/050,210.

Notice of Allowance mailed Jan. 21, 2014 in U.S. Appl. No. 13/050,210.

\* cited by examiner

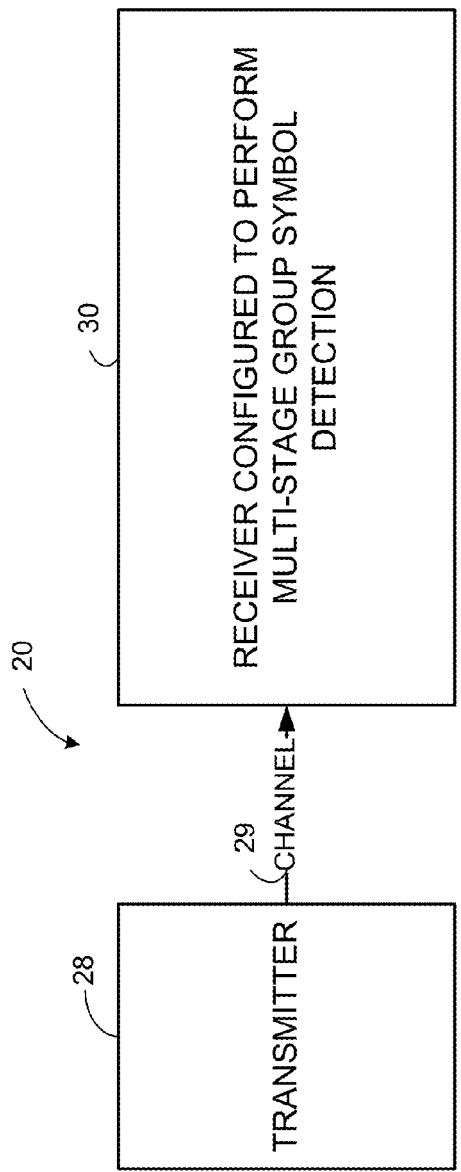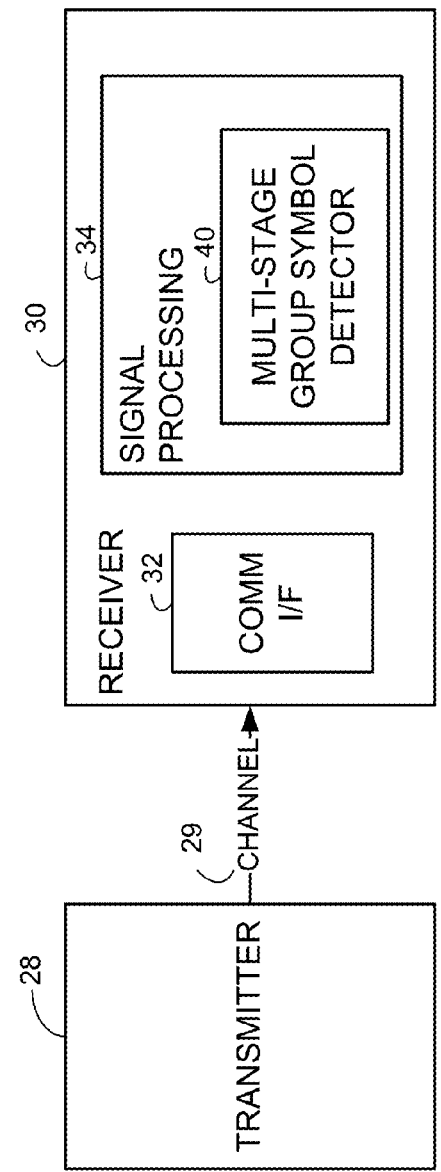

FREQUENCY-DOMAIN MULTI-STAGE GROUP DETECTION FOR ALLEVIATING INTER-SYMBOL INTERFERENCE

This application claims the priority and benefit of U.S. Provisional Patent application 61/378,556, filed Aug. 31, 2010, entitled Frequency-Domain Subblock Equalization for Uplink LTE to Alleviate Inter-Symbol Interference", which is incorporated herein by reference in its entirety.

This application is related to U.S. patent application Ser. No. 13/050,210, filed on Mar. 17, 2011, entitled "SYMBOL DETECTION FOR ALLEVIATING INTER-SYMBOL INTERFERENCE", which is incorporated herein by reference in its entirety.

This application is related to U.S. patent application Ser. No. 13/050,697, filed on Mar. 17, 2011, entitled "INCREMENTALLY INCLUSIVE FREQUENCY DOMAIN SYMBOL JOINT DETECTION", which is incorporated herein by reference in its entirety.

TECHNICAL FIELD

This invention pertains to telecommunications, and particularly to detection of symbols transmitted over a radio channel.

BACKGROUND

In a typical cellular radio system, wireless terminals (also known as mobile stations and/or user equipment units (UEs)) communicate via a radio access network (RAN) to one or more core networks. The radio access network (RAN) covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations.

In some versions of the radio access network, several base stations are typically connected (e.g., by landlines or microwave) to a controller node (such as a radio network controller (RNC) or a base station controller (BSC)) which supervises and coordinates various activities of the plural base stations connected thereto. The radio network controllers are typically connected to one or more core networks.

The Universal Mobile Telecommunications System (UMTS) is a third generation mobile communication system, which evolved from the second generation (2G) Global System for Mobile Communications (GSM). UTRAN is essentially a radio access network using wideband code division multiple access for user equipment units (UEs). In a forum known as the Third Generation Partnership Project (3GPP), telecommunications suppliers propose and agree upon standards for third generation networks and UTRAN specifically, and investigate enhanced data rate and radio capacity. Specifications for the Evolved Universal Terrestrial Radio Access Network (E-UTRAN) are ongoing within the $3^{rd}$ Generation Partnership Project (3GPP). The Evolved Universal Terrestrial Radio Access Network (E-UTRAN) comprises the Long Term Evolution (LTE) and System Architecture Evolution (SAE). Long Term Evolution (LTE) is a variant of a 3GPP radio access technology wherein the radio base station nodes are connected to a core network (via Access Gateways, or AGWs) rather than to radio network controller (RNC) nodes. In general, in LTE the functions of a radio network controller (RNC) node are distributed between the radio base stations nodes (eNodeB in LTE) and AGWs. As such, the radio access network (RAN) of an LTE system has an essentially "flat" architecture comprising radio base station nodes without reporting to radio network controller (RNC) nodes.

Long Term Evolution (LTE) uses single-carrier frequency-division multiple access (SC-FDMA) in an uplink direction from the wireless terminal to the eNodeB. SC-FDMA is advantageous in terms of power amplifier (PA) efficiency since, e.g., the SC-FDMA signal has a smaller peak-to-average ratio than an orthogonal frequency division multiple access (OFDM) signal. However, SC-FDMA gives rise to inter-symbol interference (ISI) problem in dispersive channels. Addressing inter-symbol interference (ISI) can enable SC-FDMA to improve power amplifier efficiency without sacrificing performance.

Frequency-domain (FD) linear equalization (LE) is commonly used in the LTE uplink to deal with inter-symbol interference (ISI). In frequency domain linear equalization, inter-symbol interference (ISI) is modeled as colored noise, which is then suppressed by the linear equalization. A popular linear equalization approach is linear minimum mean square error (LMMSE) equalization. Linear minimum mean square error (LMMSE) equalization is described, e.g., by H. Sari, G. Karam, and I. Jeanclaude, "Frequency-domain equalization of mobile radio and terrestrial broadcast channels," in Proc. IEEE Global Telecommun. Conf., vol. 1, November 1994, which is incorporated herein by reference in its entirety. However, performance of LMMSE equalization is limited. When the allocated bandwidth is large and when the channel is highly dispersive, a more sophisticated receiver is needed in order to ensure robust reception.

Soft cancellation-based MMSE turbo equalization has been considered for use on the uplink in LTE. With a receiver using soft cancellation-based MMSE turbo equalization, inter-symbol interference (ISI) is cancelled via soft decision-feedback equalization (DFE), where the tentatively detected soft symbols are determined based on turbo decoder outputs. The performance of such a receiver improves when more information exchanges between the decoder and soft DFE/demodulator take place. Although turbo equalization achieves superior performance, it incurs a large latency due to the iterative demodulation and decoding process.

Maximum-likelihood detection (MLD) is a well-known approach to address the inter-symbol interference (ISI) and multiple input/multiple output (MIMO) interference. Maximum-likelihood detection (MLD) does not involve the decoder cooperation and thus does not incur as a long latency as turbo equalization does. However, when there are too many overlapping symbols, Maximum-likelihood detection (MLD) becomes impractical due to complexity.

SUMMARY

In one of its aspects the technology disclosed herein concerns a receiver which comprises a communication interface and a multi-stage group symbol detector. The communication interface is configured to receive, on plural subcarriers transmitted over a radio interface, a frequency domain received signal that comprises contribution from a block of time domain symbols.

In an example embodiment the receiver comprises a plurality of receive antennas and electronic circuitry. The plurality of receive antennas are configured to receive, on plural subcarriers transmitted over a radio interface, a frequency domain signal that comprises contribution from a block of time domain symbols. The electronic circuitry is configured and/or operable to serve as the multi-stage group symbol detector, e.g., to perform symbol detection of the time domain symbols comprising the block by performing a multi-stage joint detection procedure comprising plural stages.

To perform the multi-stage joint detection procedure the electronic circuitry is configured for a first stage to divide the block into a first number of sub-blocks each having a first sub-block size. The electronic circuitry is configured for a second stage to divide the block into a second number of sub-blocks each having a second sub-block size, the second sub-block size being greater than the first sub-block size. The electronic circuitry is operable to/configured for each stage to formulate frequency domain combining weights and to use the frequency domain combining weights for combining multiple received versions of each subcarrier to provide candidate symbol combination values for symbols in each sub-block of the respective stage. The frequency domain combining weights of each stage are dependent on the sub-block size of the respective stage and thus differing from stage to stage, the multiple receive versions of each subcarrier are received over a different receive antenna. For the second stage the electronic circuitry is further configured to use the candidate symbol combination values of the first stage to formulate joint hypotheses to serve as candidates for the joint detection operation of the second stage.

In an example embodiment the electronic circuitry is further configured/operable to jointly detect the number of symbols comprising the sub-block for each of the first stage and the second stage and for each sub-block of each stage to evaluate plural detection metrics that are appropriate for the respective stage.

In an example embodiment the electronic circuitry is operable/configured for each stage to divide the block into one or more sub-blocks so that, with increasing stage, a number of sub-blocks decreases and the sub-block size increases until a last stage in which a last stage sub-block includes all the symbols of the block. The electronic circuitry is further configured, for each stage and for each sub-block separately within the stage, to jointly detect the symbols comprising the sub-block on the basis of candidates for each symbol or symbol combination from a previous stage and thereby provide the candidate symbol combination values for the use in the stage. The electronic circuitry is further configured, at the end of each stage excepting the last stage, to retain the most likely candidate symbol combination values as the candidates for a next stage, and to output best symbol values of the last stage as jointly detected symbol values of the block.

In an example embodiment the electronic circuitry is configured as follows:
in performing a first stage:
  to divide the block into sub-blocks comprising P number of symbols
  for each sub-block separately, to jointly detect the P number of symbols comprising the sub-block on the basis of candidates for each symbol; and
  to retain the most likely combinations as the candidates for the next stage;
in performing a second stage:
  to divide the block into sub-blocks comprising 2P number of symbols;
  for each sub-block separately, to jointly detect the 2P number of symbols comprising the sub-block on the basis of candidates retained from the first stage; and
  to retain the most likely combinations as the candidates for the next stage in performing an $m^{th}$ stage:
  to divide the block into sub-blocks comprising $2^{m-1}P$ number of symbols;
  for each sub-block separately, to jointly detect the $2^{m-1}P$ number of symbols comprising the sub-block on the basis of candidates retained from stage m−1; and
  to retain the most likely combinations as the candidates for the next stage;
in performing a final stage:
  to jointly detect all the symbols of the block on the basis of candidates retained from a next-to-last stage; and
  to output the best symbol values of the last stage as the jointly detected symbol values of the block.

In an example embodiment the electronic circuitry is further configured, in performing each stage to jointly detect the symbols of the sub-block while treating symbols of the block that are outside of the sub-block as noise.

In an example embodiment the electronic circuitry is further configured, in performing each stage, to use properties related to symbols of the block that are outside of the sub-block for generating combining weights. In an example embodiment, the properties related to the symbols of the block which are outside of the sub-block comprises frequency characteristics and spatial correlation of the symbols of the block which are outside of the sub-block. In an example embodiment, all the sub-blocks share same combining weights for combining multiple receive versions of each subcarrier, each receive version being received over a receive antenna.

In an example embodiment, the electronic circuitry is further configured, in performing a preliminary stage before the first stage: to divide the block into sub-blocks each comprising one symbol; for each sub-block separately, to detect the symbol of the sub-block using candidates; and, to retain the most likely candidate symbol combination values as the candidates for the first stage.

In an example embodiment the electronic circuitry is further configured to use linear minimum mean square error equalization to detect the symbol of the sub-blocks of the preliminary stage.

In an example embodiment the electronic circuitry is further configured, for any stage b wherein the block does not have sufficient number of symbols to fill an incomplete sub-block, to fill in the incomplete sub-block with dummy symbols having one constellation point of value zero so that the incomplete sub-block becomes complete with $P^b$ number of symbols.

In an example embodiment the receiver is a base station and wherein the communications interface comprising plural receive antennas are configured to receive the frequency domain signal on an uplink channel. In an example embodiment the uplink channel is at least one of a Physical Uplink Shared Channel (PUSCH) and a Physical Uplink Control Channel (PUCCH).

In another of its aspects the technology disclosed herein concerns a method of operating a receiver, on plural subcarriers transmitted over a radio interface, a frequency domain received signal that comprises contribution from a block of time domain symbols. In an example embodiment and mode the method comprises performing symbol detection of time domain symbols comprising the block by performing a multi-stage joint detection procedure comprising plural stages. In an example embodiment and mode the multi-stage joint detection procedure comprises, for a first stage, dividing the block into a first number of sub-blocks each having a first sub-block first size. The multi-stage joint detection procedure further comprises, for a second stage, dividing the block into a second number of sub-blocks each having a second sub-block size, the second sub-block size being greater than the first sub-block size. The multi-stage joint detection procedure further comprises, for each stage, formulating frequency domain combining weights and using the frequency domain combining weights for combining multiple receive versions of each subcarrier to provide candidate symbol combination values for symbols in each sub-block of the respective stage. The frequency domain combining weights of each stage are dependent on the sub-block size of the respective stage and thus differing from stage to stage, the multiple receive versions of each subcarrier being received over a different receive antenna. The multi-stage joint detection procedure further comprises, for the second stage, using the candidate symbol combination values of the first stage to formulate joint hypotheses to serve as candidates for the joint detection operation of the second stage.

In an example embodiment and mode the method comprises jointly detecting the number of symbols comprising the sub-block for each of the first stage and the second stage and for each sub-block of each stage evaluating plural detection metrics that are appropriate for the respective stage.

In an example embodiment and mode the method comprises, for each stage, dividing the block into one or more sub-blocks so that, with increasing stage, a number of sub-blocks decreases and the sub-block size increases until a last stage in which a last stage sub-block includes all the symbols of the block. In such example method and mode the method further comprises, for each stage and for each sub-block separately within the stage, jointly detecting the symbols comprising the sub-block on the basis of candidates for each symbol or symbol combination from a previous stage and thereby providing the candidate symbol combination values for the use in the stage. In such example method and mode the method further comprises, at the end of each stage excepting the last stage, retaining the most likely candidate symbol combination values as the candidates for a next stage. In such example method and mode the method further comprises outputting best symbol values of the last stage as jointly detected symbol values of the block.

In an example embodiment and mode the method comprises:
  in performing a first stage:
    dividing the block into sub-blocks comprising P number of symbols;
    for each sub-block separately, jointly detecting the P number of symbols comprising the sub-block on the basis of candidates for each symbol; and,
    retaining the most likely combinations as the candidates for the next stage;
  in performing a second stage:
    dividing the block into sub-blocks comprising 2P number of symbols;
    for each sub-block separately, jointly detecting the 2P number of symbols comprising the sub-block on the basis of candidates retained from the first stage; and
    retaining the most likely combinations as the candidates for the next stage;
  in performing an $m^{th}$ stage:
    dividing the block into sub-blocks comprising $2^{m-1}P$ number of symbols;
    for each sub-block separately, jointly detecting the $2^{m-1}P$ number of symbols comprising the sub-block on the basis of candidates retained from stage m−1; and
    retaining the most likely combinations as the candidates for the next stage;
  in performing a final stage:
    jointly detecting all the symbols of the block on the basis of candidates retained from a next-to-last stage; and
    outputting the best symbol values of the last stage as the jointly detected symbol values of the block.

In an example embodiment and mode the method further comprises, in performing each stage, jointly detecting the symbols of the sub-block while treating symbols of the block that are outside of the sub-block as noise.

In an example embodiment and mode the method further comprises, in performing each stage, using properties related to symbols of the block that are outside of the sub-block for generating combining weights. The properties related to the symbols of the block that are outside of the sub-block may comprise frequency characteristics and spatial correlation of the symbols of the block that are outside of the sub-block.

In an example embodiment and mode, all sub-blocks share same combining weights for combining multiple receive versions of each subcarrier, each receive version being received over a receive antenna.

In an example embodiment and mode the method further comprises, in performing a preliminary stage before the first stage: dividing the block into sub-blocks each comprising one symbol; for each sub-block separately, detecting the symbol of the sub-block using candidates; and retaining the most likely candidate symbol combination values as the candidates for the first stage.

In an example embodiment and mode the method further comprises using linear minimum mean square error equalization to detect the symbol of the sub-blocks of the preliminary stage.

In an example embodiment and mode the method further comprises, for any stage b wherein the block does not have sufficient number of symbols to fill an incomplete sub-block, filling in the incomplete sub-block with dummy symbols having one constellation point of value zero so that the incomplete sub-block becomes complete with $P^b$ number of symbols.

In an example embodiment and mode acts of the method are performed at a base station comprising plural receive antennas and configured to receive the block on an uplink channel. For example, the uplink channel may be at least one of a Physical Uplink Shared Channel (PUSCH) and a Physical Uplink Control Channel (PUCCH).

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 1 is a diagrammatic view of portions of a telecommunications network according to an example embodiment.

FIG. 3 is a diagrammatic view of portions of a telecommunications network according to an example embodiment showing selected basic functionalities of a receiver.

DETAILED DESCRIPTION

Figure 2:
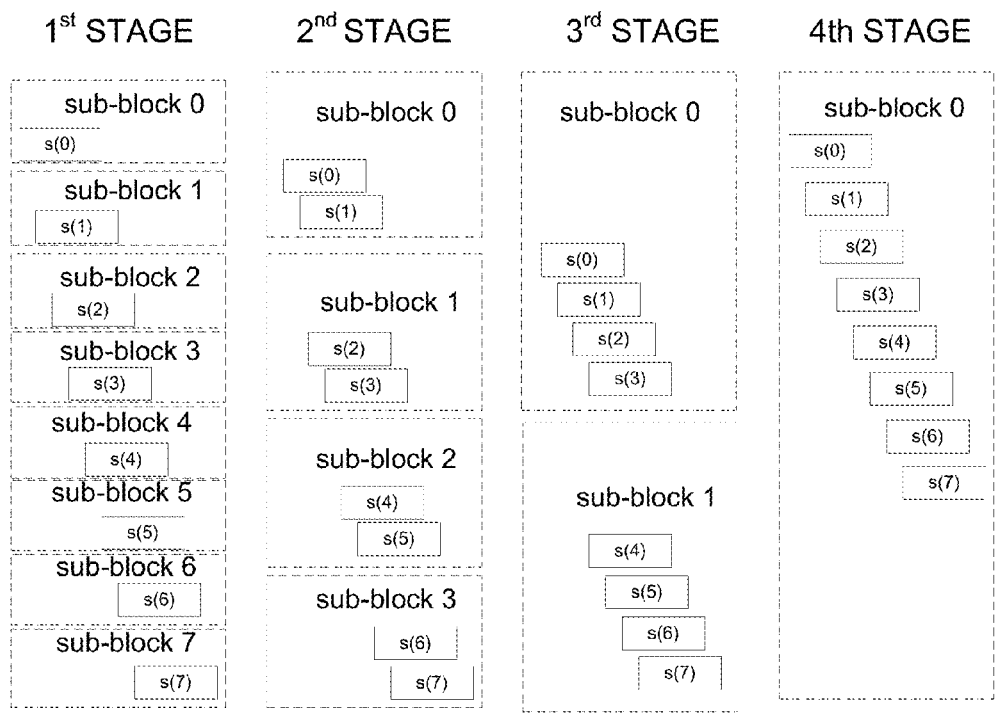
FIG. 2 is a diagrammatic view illustrating staged division of a block into sub-blocks according to an example embodiment and mode.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

FIG. 1 shows portions of a telecommunications network 20, and particularly a telecommunications network 20 comprising a transmitter 28 which communicates over a channel 29, e.g., an air interface, with a wireless receiver 30. The transmitter 28 is of a type that modulates a block of symbols onto plural radio frequency subcarriers for transmission as a signal over the channel 29. As explained in more detail subsequently, as part of its signal processing the receiver 30 performs a multi-stage group detection procedure. In the multi-stage group detection procedure, in different successive stages the block received from the transmitter is differently divided into sub-blocks, as simply illustrated in FIG. 2, with a decreasing number of sub-blocks for successive stages and increasing number of symbols per sub-block for successive stages. Within each stage and for each sub-block the receiver 30 jointly detects symbols within the sub-block, passing best candidates from a previous stage to a successive stage until detected symbols for the block are outputted from a final stage.

The wireless receiver 30 described herein can be any device which receives transmissions over an air interface. In some example, non-limiting embodiments, the wireless receiver 30 may take the form of a radio base station node of a radio access network, which (in LTE parlance) may also have the name of an eNodeB or eNB. Moreover, in some example, non-limiting embodiments and modes the blocks described herein may comprise information transmitted on an uplink from a wireless device such as a user equipment unit (UE) to a base station node, and particularly information transmitted over an uplink channel such as, for example, at least one of a Physical Uplink Shared Channel (PUSCH) and a Physical Uplink Control Channel (PUCCH).

FIG. 3 shows basic functionalities of a wireless receiver according to an example embodiment. The wireless receiver of FIG. 3 comprises communication interface 32 and signal processing section 34. The communication interface 32 is connected to or comprises a plurality of receive antennas. In an example embodiment the signal processing section 34 may be realized by an electronic circuit or platform as herein described, e.g., with reference to FIG. 11. The electronic circuit serves as, e.g., or is comprised of, symbol detector 40. In the embodiment of FIG. 3 it is the symbol detector 40 of the signal processing section 34 which performs the multi-stage group detection procedure. The symbol detector 40 is thus also known as a multi-stage group symbol detector.

Figure 4:
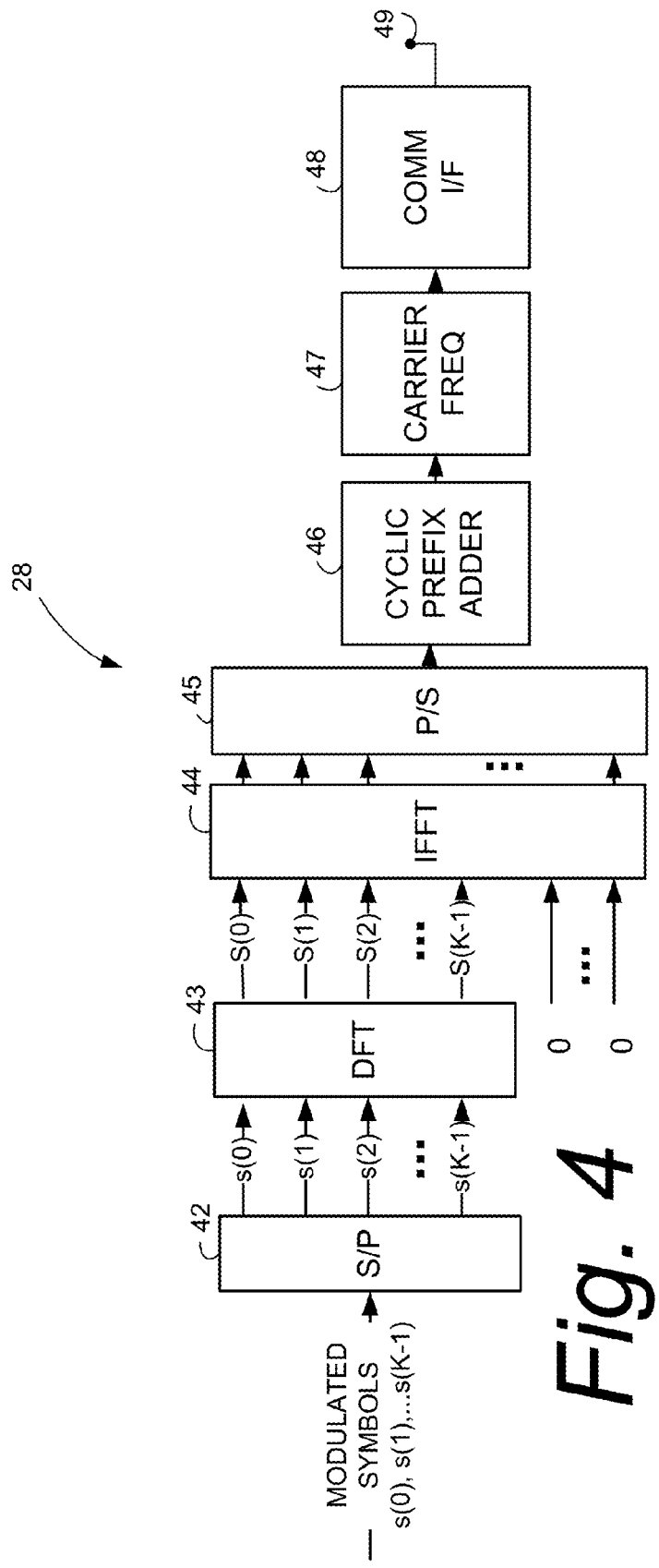
FIG. 4 is a schematic view of selected basic functionalities of a transmitter according to an example embodiment.

Advantages in performing the multi-stage group detection procedure are especially appreciated when viewed in light of the nature of the signal transmitted by transmitter 28 over the channel 29. FIG. 4 shows more details of an example transmitter 28 which is suitable use with Long Term Evolution (LTE). The FIG. 4 transmitter 28 comprises serial-to-parallel converter 42; discrete Fourier transformation section 43; modulation section 44; parallel-to-serial converter 45; cyclic prefix adder 46; carrier frequency shifter 47; and communication interface 48.

FIG. 4 further shows a serial stream of modulated time domain symbols s(0), s(1), ... s(K−1) incoming to transmitter 28 being converted to parallel symbols s(0), s(1), ... s(K−1) by serial-to-parallel converter 42. The parallel time domain symbols s(0), s(1), ... s(K−1) are applied to input ports of discrete Fourier transformation section 43 which performs a conversion to the frequency domain. For example, time-domain symbols s(0), s(1), . . . , s(K−1) are precoded via a discrete Fourier transform (DFT) 43 to produce K number of frequency-domain symbols according to Expression 1.

$$S(k) = \frac{1}{\sqrt{K}} \sum_{i=0}^{K-1} s(i) e^{\frac{-j2\pi i k}{K}}, 0 \leq k \leq K-1 \qquad \text{Expression 1}$$

$$S = Fs \qquad \text{Expression 2}$$

Expression 2 above shows a vector representation of the frequency domain symbols, time domain symbols, and the DFT precoding process, where $S=(S(0), S(1), \ldots, S(K-1))^T$, $s=(s(0), s(1), \ldots, s(K-1))^T$, K is the size of the DFT, and the (k,i) component of matrix F is $$f_{ki} = \frac{e^{\frac{-j2\pi i k}{K}}}{\sqrt{K}}.$$

Herein it is assumed the symbol energy is normalized to have unity average symbol energy, $E[|s(k)|^2]=E[|S(k)|^2]=1$ Each of the time-domain symbols is generated according to a modulation scheme used by the transmitter 28. A modulation scheme can for example be QPSK, which has four constellation points, 16-QAM, which has 16 constellation points, or 64-QAM, which has 64 constellation points. The frequency-domain symbols S(0), S(1), ... S(K−1) output from discrete Fourier transform (DFT) 43 are applied to an Inverse Fast Fourier Transformer (IFFT) modulation section 44. Each frequency-domain symbol is modulated on a subcarrier allocated to the user of interest, as understood with reference to Expression 3.

$$x(t) = \sum_{k=0}^{K-1} S(k) e^{j2\pi(k-K_s)(t-t_{cp})\Delta f} \qquad \text{Expression 3}$$

In Expression 3, K is the number subcarriers allocated to a user (e.g., the "user of interest"), $t_{cp}$ is the duration of the cyclic prefix, $K_s$ is a frequency offset used to shift the baseband signal to have a center frequency at D.C., and, $\Delta f=15$ kHz. Thus x(t) can be thought of as a periodic signal with period $1/\Delta f$; however the transmitted signal is truncated to have a duration of $t_{cp}+1/\Delta f$. The baseband time-continuous signal x(t) (with $K_s=0$) can be generated by first generating a discrete-time series of samples $x_n=x(n\Delta t)$ over one signal period, $1/\Delta f$. Here, the time interval between two discrete samples is $\Delta t=1/\Delta f/N$, where integer N is chosen to achieve accurate representation of the time-continuous baseband signal x(t) through the discrete-time series of samples $\{x_n\}_{n=0}^{N-1}$. With a sufficiently large value of N, x(t) can be accurately generated through passing $\{x_n\}_{n=0}^{N-1}$ to a digital to analog (D/A) filter. A computationally efficient method of generating $\{x_n\}_{n=0}^{N-1}$ is to perform an N-point IFFT operation on the frequency domain symbols S(0), S(1), ... S(K−1). Typically, N>K, and in such cases S(k) is set to zero for k≥K, as illustrated in FIG. 4.

The outputs of IFFT 44 are then applied to parallel-to-serial (P/S) converter 45, which outputs the discrete-time series of samples $\{x_n\}_{n=0}^{N-1}$ to cyclic prefix adder 46. The stream with inserted cyclic prefix after D/A filtering is shifted to appropriate subcarrier frequency(ies) by carrier frequency shifter 47. That is, the carrier frequency shifter 47 shifts the baseband signal to a subcarrier frequency according to the band for the operation, and then to communication interface 48. As shown in FIG. 4, the communication interface 48 may comprise transmit antenna 49. In another embodiment, the entire transmitter 28 can be duplicated to support transmitting an additional stream or layer of data for a MIMO transmission, for example.

The transmitter 28 thus originally received K symbols in the time domain, but through, e.g., the DFT process, each frequency domain symbol becomes a function of these K time domain symbols. In time dispersion over the channel 29 these K time domain symbols may mingle together or interfere with each other to cause the inter-symbol interference (ISI) phenomena earlier mentioned.

The receiver 30 receives a received signal of duration $t_{cp}+1/\Delta f$ that includes a block of K number of symbols of interest which is referred to as a symbol block or "block". There is one frequency domain symbol per subcarrier, but each time domain symbol which is being detected is spread of all K subcarriers. In view of the inter-symbol interference (ISI), the receiver 30 advantageously performs joint detection of symbols in the block. But the number K can be quite large, e.g., K=300 or so with a 5 MHz bandwidth allocation for a non-MIMO application, and can be much larger for a MIMO application. In view, e.g., of the large size of K, joint detection of all symbols of the block in a single stage is much too complicated if not impossible. For example, if each time domain symbol uses 16-QAM modulation, this involves evaluating $16^{300}$ joint hypotheses and detect the one joint hypothesis that has the best metric. Therefore, the receiver 30 of the technology disclosed herein also advantageously divides the joint detection process into a number of stages. Each stages works with evaluating a much smaller number of joint hypotheses. This is achieved by first dividing a symbol block into plural sub-blocks in each stage as illustrated in FIG. 2. The reduced number of symbols in a sub-block reduces the number of joint hypotheses. Complexity reduction is also achieved by limiting the joint hypotheses to the ones which have survived the pruning process in the previous stage. More details on the pruning process are given below.

Figure 5:
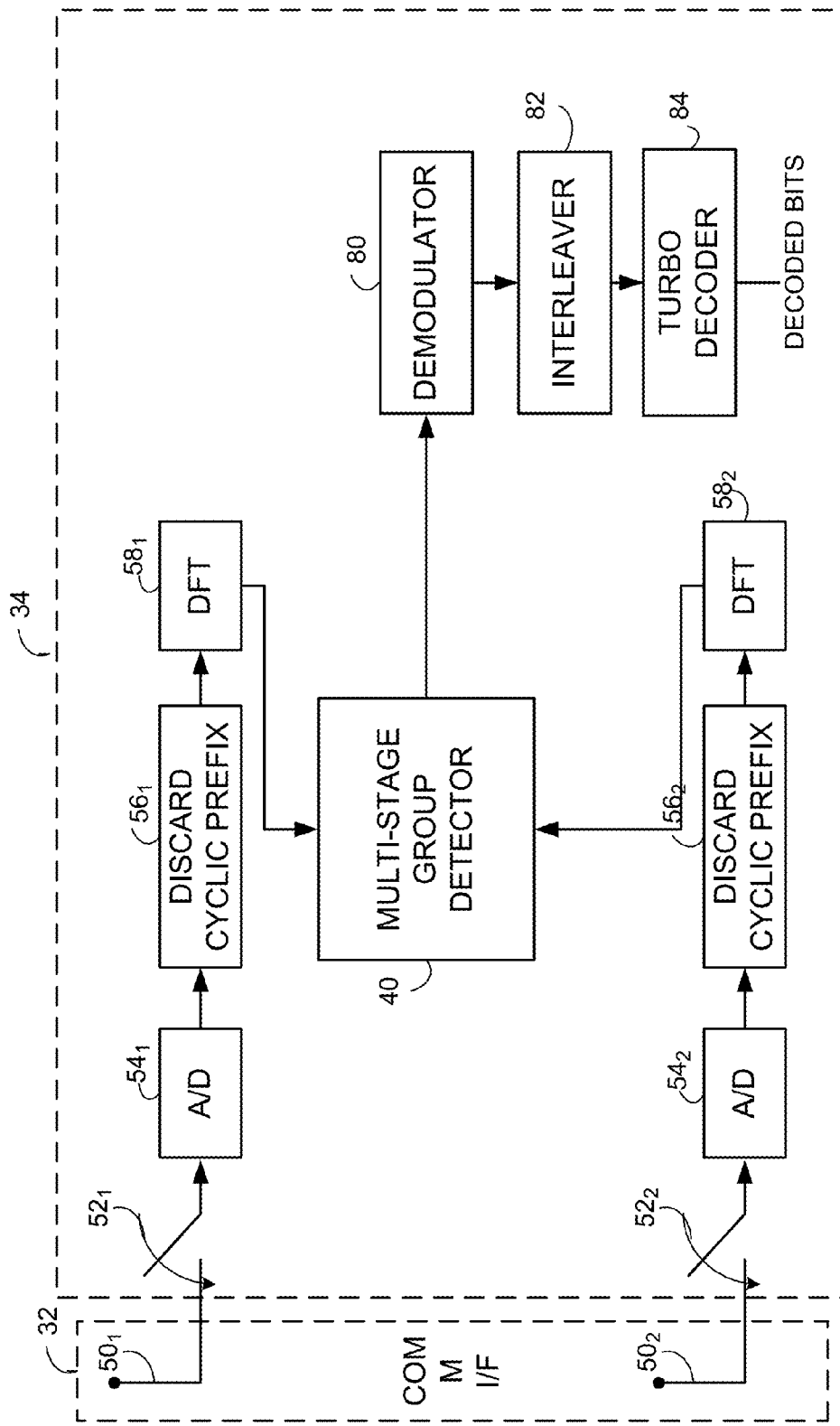
FIG. 5 is a schematic view of selected basic functionalities of a receiver according to an example embodiment.

FIG. 5 shows, in more detail, an example embodiment of receiver 30 which includes symbol detector 40 configured to address the problem of inter-symbol interference (ISI) by joint detection of symbols on a sub-block basis. FIG. 5 shows communication interface 32 as comprising plural receive antennas 50 which receive time domain signal waveforms on the subcarriers transmitted by transmitter 28. The FIG. 5 embodiment particularly shows two receive antennas $50_1$ and $50_2$, but it should be understood that a greater number of receive antennas may be employed. The waveforms as received by the receive antennas $50_1$ and $50_2$ are applied to respective front end processing branches of signal processing section 34. Each front end processing channel comprises signal sampler 52; analog to digital converter (ADC) 54; cyclic prefix discard mechanism 56; and, discrete Fourier transform (DFT) 58. It should be appreciated that the number of front end processing branches of signal processing section 34 corresponds to the number of receive antennas 50, so that should a greater number of receive antennas be employed (e.g., four), a corresponding greater number of front end processing branches (e.g., four) are included in signal processing section 34.

Figure 6:
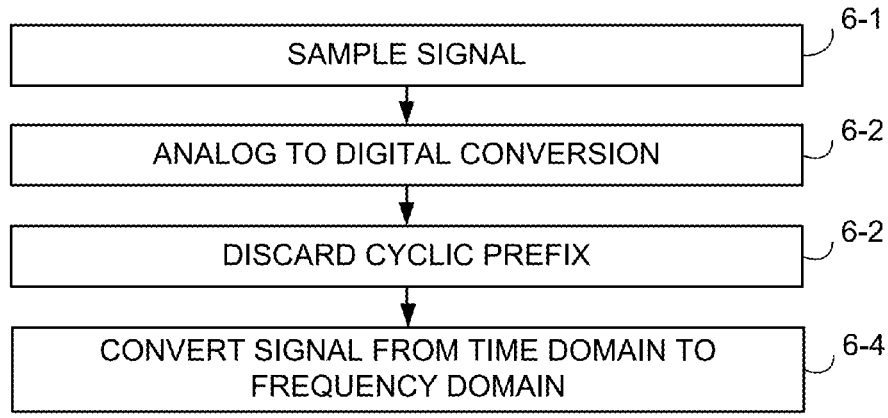
FIG. 6 is a flowchart showing basic, representative acts or steps performed by a front end processing section of a receiver in an example mode.

Basic acts encompassed by operation of portions of the front end processing branches of signal processing section 34 are depicted by FIG. 6. Act 6-1 of FIG. 6 shows the waveforms as received by the receive antennas $50_1$ and $50_2$ as being sampled by respective signal samplers $52_1$ and $52_2$, so that the values corresponding to the sampled discrete points of the waveform are applied to respective analog to digital converters (ADC) $54_1$ and $54_2$. Act 6-2 comprises the sampled discrete points of the waveform being converted from analog to digital by converters (ADC) $54_1$ and $54_2$. As act 6-3 the sampled points corresponding to the cyclic prefix (which was applied by cyclic prefix adder 46 of transmitter 28) are removed by respective cyclic prefix discard mechanisms $56_1$ and $56_2$. Thereafter the discrete-time series of the time domain signal being processed by each branch of the signal processing section 34 is applied to respective Discrete Fourier transform [DFT] (or Fast Fourier transform [FFT]) $58_1$ and $58_2$ so that (as act 6-4) the time domain received signals are converted to the frequency domain. The size of Discrete Fourier transform (or Fast Fourier transform), denoted as N, used by $58_1$ and $58_2$ is determined by the number of samples after discarding the cyclic prefix. Typically, N≥K. Recall that K is the number of subcarriers allocated to the user of interest. Thus, the output ports of $58_1$ and $58_2$ may contain subcarrier signals outside of the frequency allocation of the user of interest. In such cases, those subcarriers outside of the frequency allocation are discarded. Thereafter the frequency domain received signal corresponding to the K subcarriers allocated to the user of interest from each front end processing channel of signal processing section 34 are applied to symbol detector 40.

Stating some of the foregoing in a slightly different way, the sub-block-based joint symbol detector 40 receives from the front end processing section the frequency domain received signal for a particular user, i.e., the "user of interest". The frequency domain received signal for the particular user is obtained from the K number of subcarriers that were actually allocated to the particular user for a particular time slot. The number of subcarriers N handled by the DFT (or FFT) $58_1$ and $58_2$ may be larger than the K number of subcarriers allocated to the user, e.g., may span a bandwidth wider than the bandwidth that is allocated to a user. But the K number of subcarriers provided to the symbol detector 40 comprises the set of subcarriers which were actually allocated to the particular user (user of interest) for a scheduled time period.

Assuming that the cyclic prefix is longer than the multipath delay spread, due to the periodicity of x(t) (see Expression 3), the frequency domain (FD) received signal as received by symbol detector 40 from each front end processing channel can be represented by Expression 4. In Expression 4, index k identifies signals at the kth frequency component (subcarrier), Y(k) is frequency domain (FD) received signal; H(k) is the frequency response; and U(k) is the impairment component (e.g., noise). Here Y(k), H(k), and U(k) are represented as vectors to model the cases with multiple receive antennas, with each element in these vectors corresponding to one receive antenna. For example, the first element of Y(k) is taken from the $k^{th}$ element of the output of discrete Fourier transform (or fast Fourier transform) $58_1$, the second element of Y(k) is taken from the $k^{th}$ element of the output of discrete Fourier transform (or fast Fourier transform) $58_2$, and so on.

$$Y(k)=H(k)S(k)+U(k) \quad \text{Expression 4}$$

As understood from Expression 4, the receiver antenna signals from multiple receive antennas 50 have already been processed together to form the vector Y(k). That is, the received frequency domain signal is collected over multiple (e.g., all) subcarriers, so that symbol detector 40 has access to the total frequency domain received signal Y. The collecting signals corresponding to the multiple subcarriers into vectors or matrices, e.g., $Y=(Y^T(0), Y^T(1), \ldots, Y^T(K-1))^T$, where K is the number of frequency subcarriers allocated to the user of interest, yields Expression 5.

$$Y=HS+U \quad \text{Expression 5}$$

In Expression 5, H=diag(H(0), H(1), . . . , H(K−1)), and $U=(U^T(0), U^T(1), \ldots, U^T(K-1))^T$. Recall that H is the frequency response and U is the impairment component. In the discussion below, a shorthand notation $\text{diag}_{k=0}^{K-1}(H(k))$ is used to represent the block-diagonal matrix diag(H(0), H(1), . . . , H(K−1)).

Replacing frequency domain (FD) symbols with time domain (TD) symbols, the frequency domain (FD) received signal can be expressed with time domain symbols as Expression 6, which in turn can be rewritten as Expression 7.

$$Y=HFs+U \quad \text{Expression 6}$$

$$Y = \sum_{k=0}^{K-1} a(k)s(k) + U \quad \text{Expression 7}$$

In Expression 7, a(k) is the kth column of matrix HF, which has the form of Expression 7A.

$$a(k)=(f_{0,k}H^T(0), f_{1,k}H^T(1), \ldots, f_{K-1,k}H^T(K-1))^T \quad \text{Expression 7A}$$

Expression 7A, i.e., a(k), can be thought of as the frequency domain (FD) symbol waveform of s(k). The superscript "T" in Expression 7A (and other expressions herein) is the conventional notation for Transpose, while the superscript "H" in various expressions is the conventional notation for complex conjugant transpose. Use of vector and matrix representation makes it easier to describe certain signal processing acts mathematically.

Figure 7:
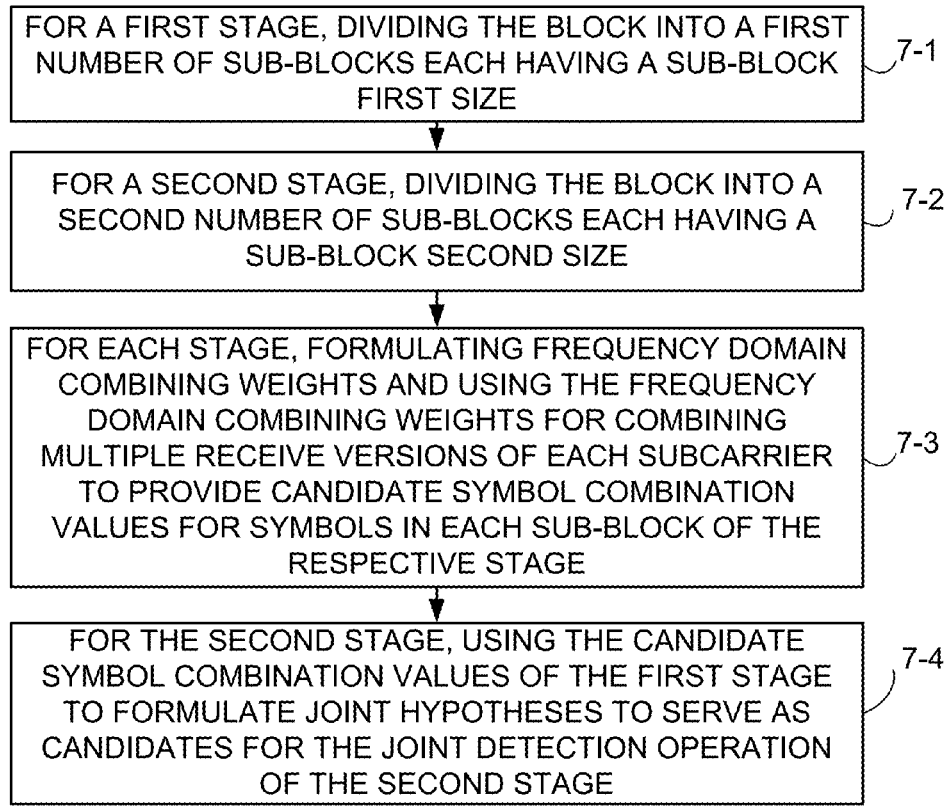
FIG. 7 is a flowchart showing basic, representative acts or steps performed by a symbol detector in a multi-stage group detection procedure in an example embodiment and mode.

Basic representative acts performed by symbol detector 40 in performing the multi-stage group detection procedure are shown in FIG. 7. Act 7-1 comprises, for a first stage, dividing the block into a first number of sub-blocks each having a sub-block first size. Act 7-2 comprises, for a second stage, dividing the block into a second number of sub-blocks each having a sub-block second size, the sub-block second size being greater than the sub-block first size. Act 7-3 comprises, for each stage, formulating frequency domain combining weights and using the frequency domain combining weights for combining multiple receive versions of each subcarrier to provide candidate symbol combination values for symbols in each sub-block of the respective stage. The frequency domain combining weights of each stage are dependent on the sub-block size of the respective stage and thus differing from stage to stage. The multiple receive versions of each subcarrier are received over a different receive antenna. Act 7-4 comprises, for the second stage, using the candidate symbol combination values of the first stage to formulate joint hypotheses to serve as candidates for the joint detection operation of the second stage.

Figure 8:
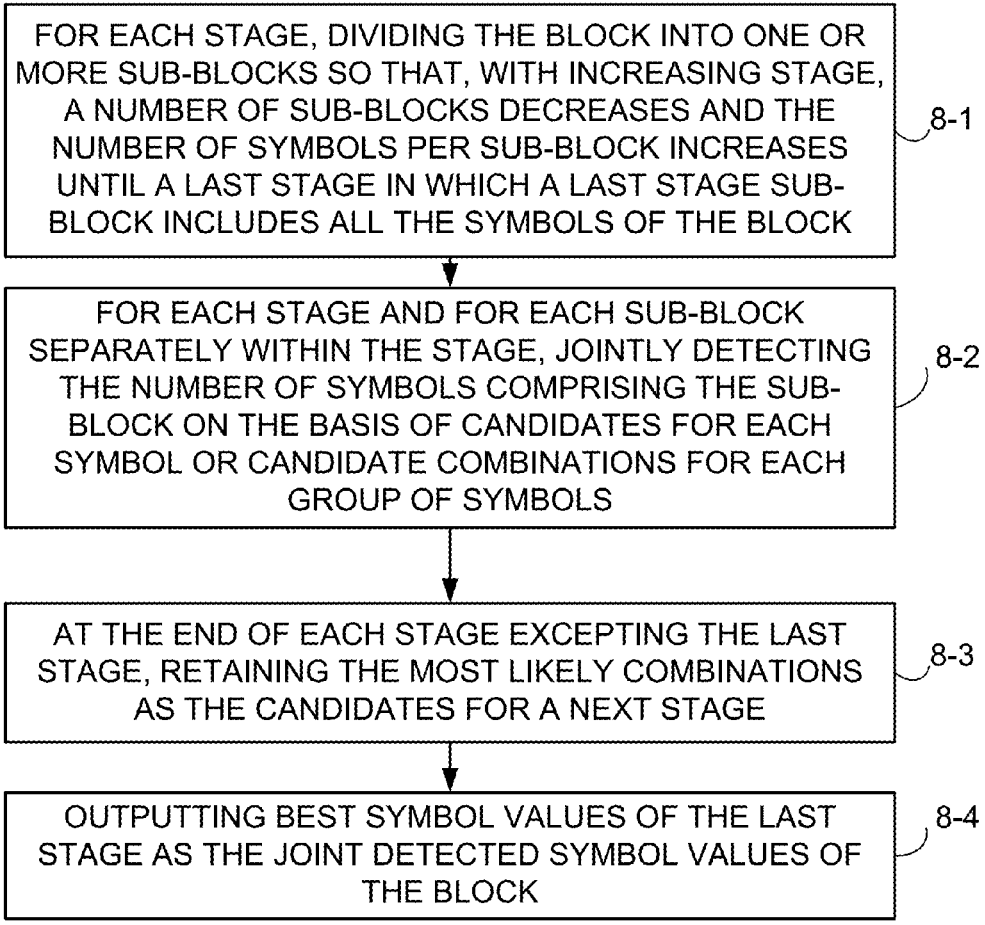
FIG. 8 is a flowchart showing basic, representative acts or steps performed by a symbol detector in a multi-stage group detection procedure in an more detailed example implementation.

FIG. 8 shows representative, non-limiting acts or steps comprising an example implementation. Act 8-1 comprises, for each stage, dividing the block into one or more sub-blocks so that, with increasing stage, a number of sub-blocks decreases and the number of symbols per sub-block increases until a last stage in which a last stage sub-block includes all the symbols of the block. Act 8-2 comprises, for each stage and for each sub-block separately within the stage, jointly detecting the number of symbols comprising the sub-block on the basis of candidates for each symbol or candidate combinations for each group of symbols. Act 8-3 comprises at the end of each stage excepting the last stage, retaining the most likely combinations as the candidates for a next stage. Act 8-4 comprises outputting best symbol values of the last stage as the joint detected symbol values of the block.

Figure 9:
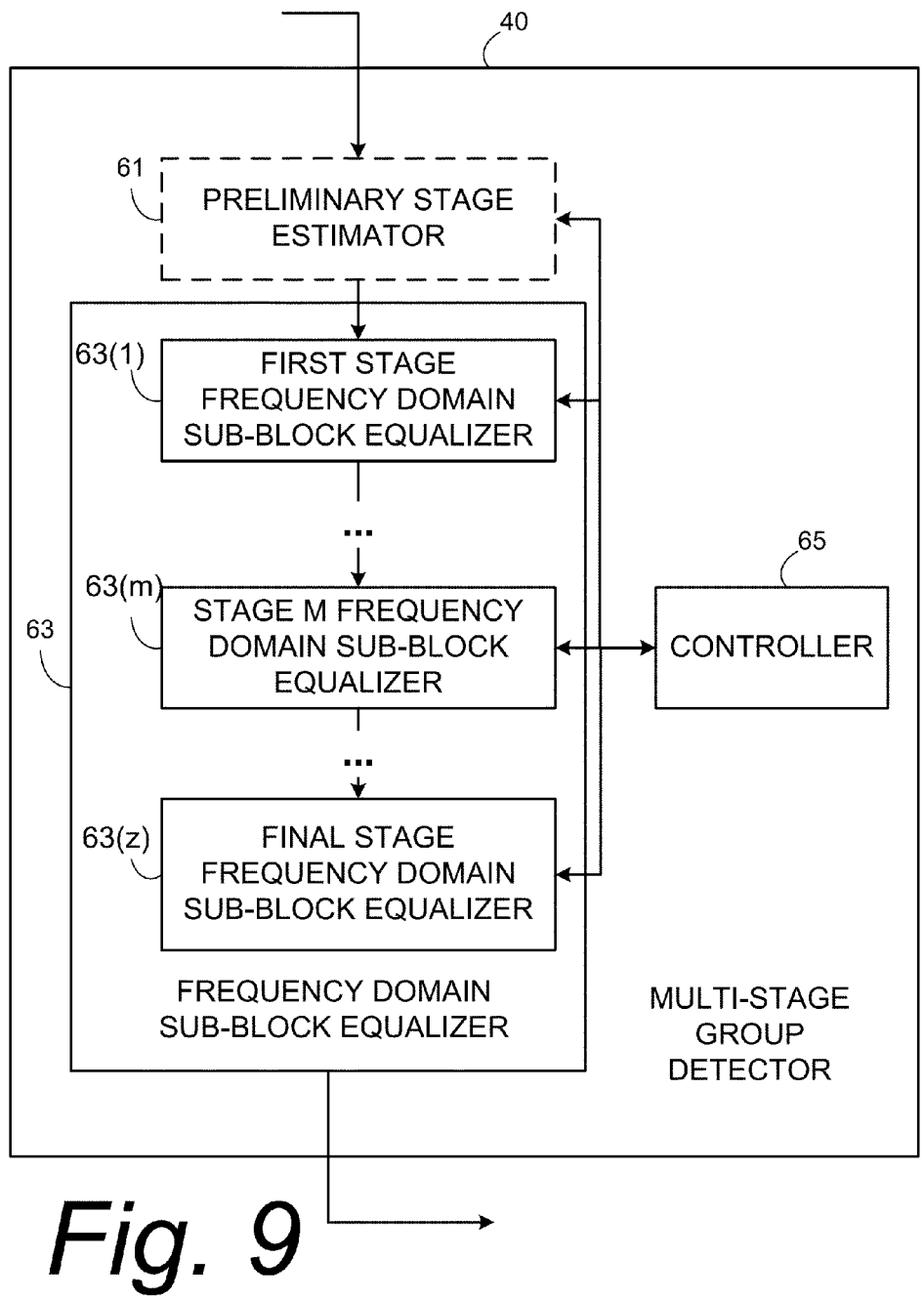
FIG. 9 is a schematic view of selected basic functionalities of a multi-stage group detector according to an example embodiment.

FIG. 9 shows an example embodiment of multi-stage group symbol detector 40 as further comprising an optional preliminary stage estimator 61; frequency domain sub-block equalizer 63; and symbol detector controller 65. It will be appreciated that the electronic circuitry that serves as, e.g., or is comprised of, the symbol detector may also serve as the optional preliminary stage estimator 61; frequency domain sub-block equalizer 63; and symbol detector controller 65.

Figure 10:
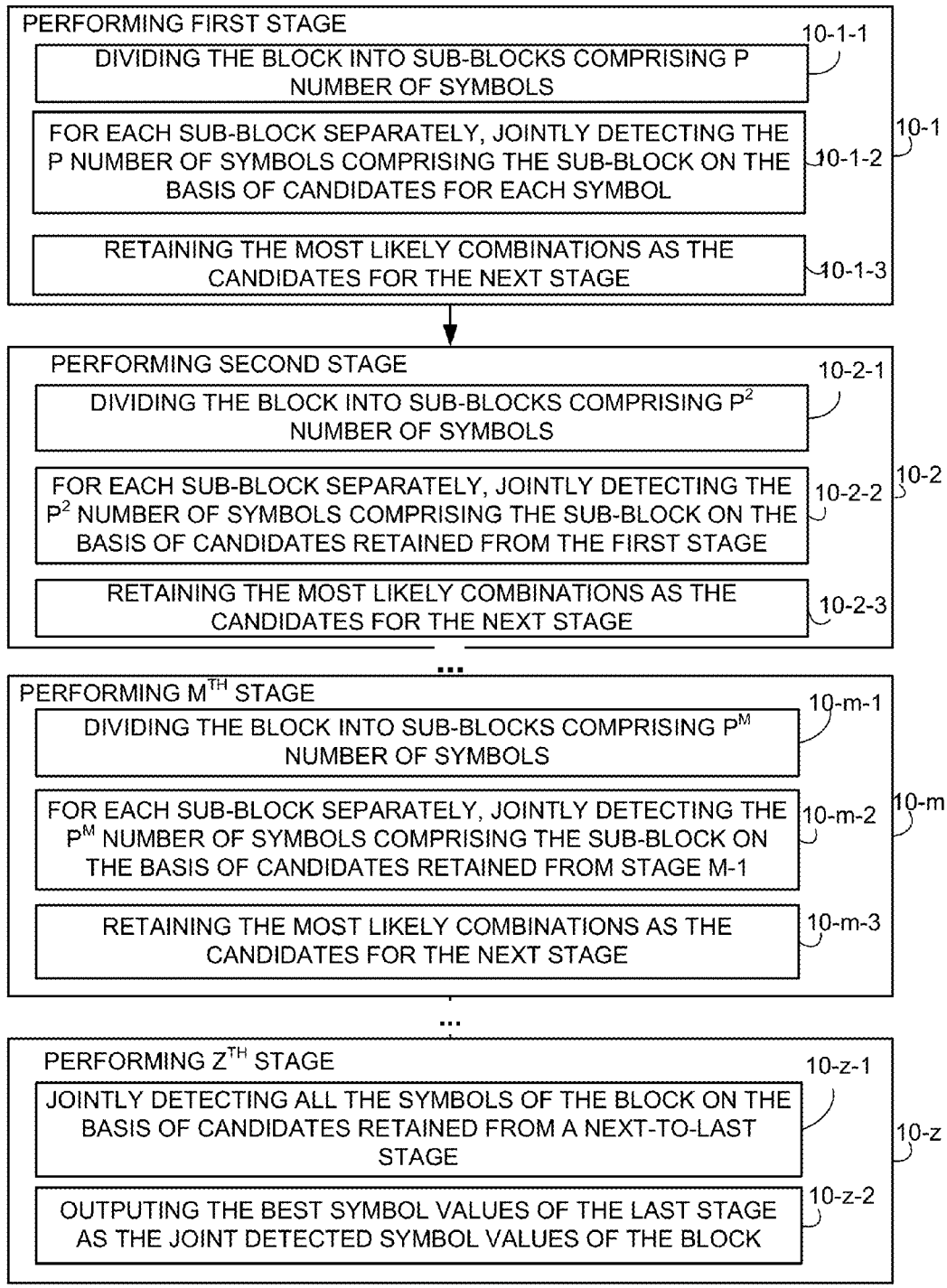
FIG. 10 is a flowchart showing basic, representative symbol detection acts or steps performed by a receiver in an example mode of performing a multi-stage group detection procedure.

The operation of each of preliminary stage estimator 61 and frequency domain sub-block equalizer 63 are supervised and sequenced by symbol detector controller 65. For example, each of a first through a last stage of the multi-stage group detection procedure are performed by frequency domain sub-block equalizer 63, with the symbol detector controller 65 prompting and controlling execution of each stage, e.g., the inputs, timing, and outputs of each stage relative to a preceding and succeeding stage. For example, in FIG. 9 a first stage of the multi-stage group detection procedure as performed by frequency domain sub-block equalizer 63 is denoted as equalization 63(a); an $m^{th}$ stage of the multi-stage group detection procedure as performed by frequency domain sub-block equalizer 63 is denoted as equalization 63(m); and, a last or final stage of the multi-stage group detection procedure as performed by frequency domain sub-block equalizer 63 is denoted as equalization 63(z). Frequency domain sub-block equalization in general is understood from, e.g., U.S. patent application Ser. No. 13/050,210, filed on Mar. 17, 2011, entitled "SYMBOL DETECTION FOR ALLEVIATING INTER-SYMBOL INTERFERENCE", which is incorporated herein by reference in its entirety, and Bottomly, Gregory E., and Wang, Y.-P. Eric, "Subblock Equalization and Code Averaging for DS-CMDA Receivers, *IEEE Transactions on Vehicular Technology*, Vol. 59, No. 7, September 2010, pages 3321-3331, which is incorporated herein by reference in its entirety FIG. 10 illustrates in more detail certain examples acts or steps comprising the multi-stage group detection procedure in an example embodiment and mode. Act 10-1 comprises performing a first stage. Sub-acts of the first stage comprise sub-acts 9-1-1 through 9-1-3. Sub-act 10-1-1 comprises dividing the block into sub-blocks comprising P number of symbols. Sub-act 10-1-2 comprises for each sub-block separately, jointly detecting the P number of symbols comprising the sub-block on the basis of candidates for each symbol. Sub-act 10-1-3 is a pruning process which comprises retaining the most likely symbol combinations for the group of P symbols comprising the sub-block as the candidates for the next stage (the second stage).

For the first stage, the frequency domain sub-block equalizer 63 of multi-stage group detection (MSGD) detector 40 detects a pair of symbols jointly. In an example implementation in which P equals two, for each pair, a total of $N_1^2$ modulation value combinations are evaluated, and out of which $N_2$ most likely combinations are kept (sub-act 10-1-3). The candidate modulation values utilized may be provided by a previous stage, such as the preliminary stage depicted in FIG. 9. If the first stage is indeed a first stage (e.g., the first stage is not preceded by a preliminary stage as described herein), the candidate modulation values for each of the P symbol could be simply the Q constellation values according to the modulation scheme used. For example, if QPSK is used, the candidate values for each of the P symbol can be $$\frac{1+j}{\sqrt{2}}, \frac{1-j}{\sqrt{2}}, \frac{-1+j}{\sqrt{2}}, \text{ or } \frac{-1-j}{\sqrt{2}};$$

thus $N_1=Q=4$. For each sub-block of P symbols, there are $4^P$ modulation value combinations that will be evaluated.

For the first stage, the decision metric for each hypothesized pair of symbols for (s(0), s(1)), for example, is given by Expression 8 with the R of Expression 8 as defined/explained in Expression 9 and the $R_U(k)$ of Expression 8 as defined/explained in Expression 10.

$$M(s(0), s(1)) = -\sum_{k=0}^{1} |s(k)|^2 a^H(k) R^{-1} a(k) + \qquad \text{Expression 8}$$

$$2\sum_{k=0}^{1} \text{Re}\{s^*(k)(R^{-1}a(k))^H Y\} - 2\text{Re}\{s(0)s^*(1) a^H(j) R^{-1} a(k)\}$$

$$R = E\left[\left(\sum_{k=2}^{K-1} a(k)s(k) + U\right)\left(\sum_{k=2}^{K-1} a(k)s(k) + U\right)^H\right] \approx \qquad \text{Expression 9}$$

$$\text{diag}_{k=0}^{K-1}\left(\frac{K-2}{K} H(k)H^H(k) + R_U(k)\right)$$

$$R_U(k) = E[U(k)U^H(k)] \qquad \text{Expression 10}$$

In essence, the contribution from the symbols not included in the sub-block that is being jointly detected is considered as impairment. Thus, $$\sum_{k=2}^{K-1} a(k)s(k)$$

is added to the impairment term U, resulting in a total impairment $$U_t = \sum_{k=2}^{K-1} a(k)s(k) + U.$$

The effect of the total impairment $U_t$ is captured via the total impairment covariance R (as defined in Expression 9) during the process of decision metric evaluation per Expression 8. The term $$\frac{K-2}{K} H(k)H^H(k)$$

in Expression 9 is contributed by the symbols not included in the sub-block that is being jointly detected.

Expression 8 depends on the combining weight(s) W (described below), which is formulated as a function of R. As such, the combining weights are formulated to suppress the interference contributed by symbols not included in the sub-block that is being jointly detected.

Act 10-2 comprises performing a second stage. Sub-acts of the second stage comprise sub-acts 9-2-1 through 9-2-3. Sub-act 10-2-1 comprises dividing the block into sub-blocks comprising 2P number of symbols. Sub-act 10-2-2 comprises for each sub-block separately, jointly detecting the 2P number of symbols comprising the sub-block on the basis of candidates retained from the first stage. As another pruning operation sub-act 10-2-3 comprises retaining the most likely combinations as the candidates for the next stage.

Act 10-m comprises performing an $m^{th}$ stage. Sub-acts of the $m^{th}$ stage comprise sub-acts 9-m-1 through 9-m-3. Sub-act 10-m-1 comprises dividing the block into sub-blocks comprising $2^{m-1}$P number of symbols. Sub-act 10-m-2 comprises for each sub-block separately, jointly detecting the $2^{m-1}$P number of symbols comprising the sub-block on the basis of candidates retained from stage m−1. As another pruning operation sub-act 10-m-3 comprises retaining the most likely combinations as the candidates for the next stage.

For each sub-block, a total of $N_m^2$ modulation value combinations are evaluated, and out of which $N_{m+1}$ most likely combinations are kept. The candidate modulation value combinations are provided by the previous stage (e.g., stage m−1). Let $K_0 = 2^{m-1}$ P be the number of symbols that are jointly detected. For each stage after the first stage, the decision metric for each hypothesized combination for (s(0), s(1), . . . , s($K_0$−1)), for example, is given by Expression 11 with the R of Expression 11 as defined/explained in Expression 12. For each sub-block of each stage there plural detection metrics which are appropriate for the respective stage (there are many detection metrics, one for each candidate symbol combination).

$$M(s(0), s(1), \ldots, s(K_0-1)) = -\sum_{k=0}^{K_0-1} |s(k)|^2 a^H(k) R^{-1} a(k) + \quad \text{Expression 11}$$

$$2 \sum_{k=0}^{K_0-1} \text{Re}\{s^*(k)(R^{-1}a(k))^H Y\} -$$

$$2 \sum_{k=0}^{K_0-1} \sum_{j=k+1}^{K_0-1} \text{Re}\{s(k)s^*(j) a^H(j) R^{-1} a(k)\}$$

$$R \approx \text{diag}_{k=0}^{K-1} \left( \frac{K-K_0}{K} H(k)H^H(k) + R_U(k) \right). \quad \text{Expression 12}$$

The term $$\frac{K-K_0}{K} H(k)H^H(k)$$

in Expression 12 is contributed by the symbols not included in the sub-block that is being jointly detected.

As one aspect of the technology disclosed herein, the decision metric expression (e.g., Expression 11) is simplified using other convenient expressions. For example, using the diagonal property of total impairment covariance matrix R, the terms in the decision metric can be simplified with the aid of a waveform cross-correlation expression (Expression 12A) and a waveform/received signal correlation (Expression 12B).

$$a^H(i) R^{-1} a(j) = \quad \text{Expression 12A}$$

$$\sum_{k=0}^{K-1} H^H(k) \left( \frac{K-K_0}{K} H(k)H^H(k) + R_U(k) \right)^{-1} H(k) f_{k,i}^* f_{k,j},$$

$$(R^{-1} a(j))^H Y = \quad \text{Expression 12B}$$

$$\sum_{k=0}^{K-1} f_{k,j}^* H^H(k) \left( \frac{K-K_0}{K} H(k)H^H(k) + R_U(k) \right)^{-1} Y(k)$$

Expression 12C below defines what is herein referred to as a combining weight. The combining weight of Expression 12C has an averaging effect, as exemplified by the $(K-K_0)/K$ term in the sense that the effect of specific waveform a(k), which is dependent of symbol index k, is averaged out, and thus as a result this final expression $(K-K_0)/K$ is independent of symbol index k. The coefficients of Expression 12C are commonly present in both Expression 11 and Expression 12. The combining weight of Expression 12C depends on the spatial correlation $R_U$ of Expression 10A. Moreover, Expression 12C is independent of symbol index and thus independent of sub-block as well.

$$W(k) = \left( \frac{K-K_0}{K} H(k)H^H(k) + R_U(k) \right)^{-1} H(k) \quad \text{Expression 12C}$$

Using these combining weights, waveform cross-correlation expression (Expression 12A) and a waveform/received signal correlation (Expression 12B) can be simply obtained by Expression D $$a^H(i)R^{-1}a(j) = \sum_{k=0}^{K-1} W^H(k)H(k)f_{k,i}^*f_{k,j},$$ Expression 12D $$(R^{-1}a(j))^H Y = \sum_{k=0}^{K-1} f_{k,j}^* W^H(k)Y(k)$$ Expression 12E These coefficients (weights) of Expression 12C can be thought as frequency domain (FD) equalization weights or combining weights, and may be (preferably are) shared between different sub-blocks. These combining weights are used to combine the frequency domain received signal from multiple receive antennas corresponding to subcarrier k as described by Expression 12E. Note that the coefficients (weights) of Expression 12 contain the term $$\left(\frac{K-K_0}{K}H(k)H^H(k)\right),$$

which (as mentioned earlier) captures the contribution from symbols outside of the sub-block of interest. As such, the interference from symbols outside of the sub-block of interest can be linearly suppressed by formulating proper combining weights.

Thus, the decision metric M of Expression 12 depends on the combining weight W (of Expression 12C), the combining weight W being formulated as a function of the total impairment covariance R (of Expression 12). As such, the combining weights are formulated to suppress the interference contributed by symbols not included in the sub-block that is being jointly detected. As understood from Expression 12C, for frequency domain equalization purposes these combining weights vary from stage to stage, e.g., are different for each stage.

Act 10-z comprises performing an $z^{th}$ or last (final) stage. Sub-acts of the $z^{th}$ stage comprise sub-acts 9-z-1 through 9-z-2. Sub-act 10-z-1 comprises jointly detecting all the symbols of the block on the basis of candidates retained from a next-to-last stage. Sub-act 10-z-2 comprises outputting the best symbol values of the last stage as the joint detected symbol values of the block.

For the final or last stage (stage z), all the symbols are jointly detected. Again, the candidate modulation value combinations are provided by the previous stage. The decision metric for each hypothesized combination is given by Expression 13 with the R of Expression 8 as defined/explained in Expression 14.

$$M(s(0), s(1), \ldots s(K-1)) =$$ Expression 13

$$-\sum_{k=0}^{K-1}|s(k)|^2 a^H(k)R^{-1}a(k) + 2\sum_{k=0}^{K-1}\operatorname{Re}\{s^*(k)(R^{-1}a(k))^H Y\} -$$

$$2\sum_{k=0}^{K-1}\sum_{j=k+1}^{K-1}\operatorname{Re}\{s(k)s^*(j)a^H(j)R^{-1}a(k)\}$$

$$R \approx \operatorname{diag}_{k=0}^{K-1}(R_U(k)).$$ Expression 14

Figure 10A:
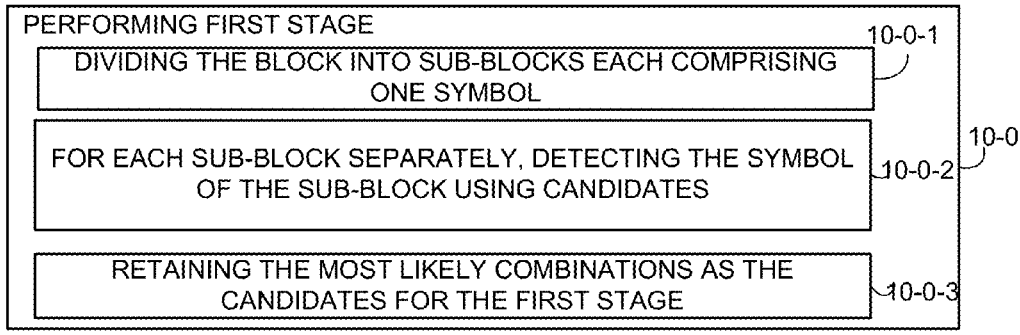
FIG. 10A is a flowchart showing basic, representative symbol detection acts or steps performed by a receiver in an optional preliminary stage of a multi-stage group detection procedure according to an example mode.

As mentioned above, in an example embodiment the multi-stage group detector 40 may include an optional preliminary stage estimator 61. When including the optional preliminary stage estimator 61, the multi-stage group detector 40 may also as act 10-0 (see FIG. 10A) perform a preliminary stage (e.g., stage 0) before performing the first stage, e.g., before performing act 10-1 of FIG. 10. Example acts comprising the preliminary stage (stage 0) are illustrated in FIG. 10A. Act 10-0-1 comprises dividing the block into sub-blocks each comprising one symbol. Act 10-0-2 comprises, for each sub-block separately, detecting the symbol of the sub-block using candidates. In an example embodiment, the detector is further configured to use linear minimum mean square error equalization to detect the symbol of the sub-blocks of the preliminary stage. Act 10-0-3 comprises retaining the most likely combinations as the candidates for the first stage.

In other words, in the preliminary stage (e.g., act 10-0 and stage 0) the multi-stage group detection (MSGD) detector 40 may perform a linear mean square error equalization (MMSE) estimate to produce a list of $N_1$ candidates for each of the time domain symbols s(k). In this case, the frequency domain combining weight is simply the regular MMSE combining weight $W(k)=(H(k)H^H(k)+R_U(k))^{-1}H(k)$.

In an example embodiment the detector is further configured, for any stage b wherein the block does not have sufficient number of symbols to fill an incomplete sub-block, to fill in the incomplete sub-block with dummy symbols having one constellation point of value zero so that the incomplete sub-block becomes complete with $P^b$ number of symbols. In other words, if K is not a power of 2, dummy symbols with 1 constellation point of value 0 may be used whenever necessary, as illustrated in the example below.

Example Scenario

Multi-Stage Group Detection Procedure

In an example scenario multi-stage group detection may be employed to detect a SC-FDMA signal consisting of 300 subcarriers (K=300). Brief description of operation/results of stages 0-9 are provided below.

Stage 0 (Optional Preliminary Stage): use frequency domain MMSE equalizer for symbol-by-symbol detection (i.e., each symbol is detected individually). For each transmitted symbol, 4 candidates are kept.

Stage 1: use FD block equalizer to detect pairs of symbol, (s(0),s(1)), (s(2),s(3)), . . . , (s(298),s(299)). For each pair, there are 16 candidate combinations, out of which 8 candidate combinations deemed most likely survived.

Stage 2: use FD block equalizer to detect sub-blocks of symbols, (s(0),s(1),s(2),s(3)), (s(4),s(5),s(6),s(7)), . . . , (s(296),s(297),s(298),s(299)). For each sub-block, there are 64 candidate combinations, out of which 16 candidate combinations deemed most likely survived.

Stage 3: use FD block equalizer to detect sub-blocks of symbols, (s(0),s(1), . . . , s(7)),(s(8),s(9), . . . , s(15)) . . . , (s(296),s(297), . . . , s(299), x,x,x,x). Here x represents the dummy symbol. For each sub-block (except for the last sub-block), there are 256 candidate combinations, out of which 32 candidate combinations deemed most likely survived.

Stage 4: use FD block equalizer to detect sub-blocks of symbols, (s(0),s(1), . . . , s(15)),(s(16),s(17), . . . , s(31)) . . . , (s(288),s(289), . . . , s(299), x,x,x,x). For each sub-block (except for the last sub-block), there are 1024 candidate combinations, out of which 32 candidate combinations deemed most likely survived.

Stage 5: use FD block equalizer to detect sub-blocks of symbols, (s(0),s(1), . . . , s(31)),(s(32),s(33), . . . , s(63)) . . . , (s(288),s(289), . . . , s(299), x, . . . , x). For each sub-block (except for the last sub-block), there are 1024 candidate combinations, out of which 32 candidate combinations deemed most likely survived.

Stage 6: use FD block equalizer to detect sub-blocks of symbols, (s(0),s(1), ... , s(63)),(s(64),s(65), ... , s(127)) ... , (s(256),s(289), ... , s(299), x, ... , x). For each sub-block (except for the last sub-block), there are 1024 candidate combinations, out of which 32 candidate combinations deemed most likely survived.

Stage 7: use FD block equalizer to detect sub-blocks of symbols, (s(0),s(1), ... , s(127)),(s(128),s(129), ... , s(255)), (s(256),s(289), ... , s(299), x, ... , x). For each sub-block (except for the last sub-block), there are 1024 candidate combinations, out of which 32 candidate combinations deemed most likely survived.

Stage 8: use FD block equalizer to detect sub-blocks of symbols, (s(0),s(1), ... , s(255)),(s(256),s(289), ... , s(299), x, ... , x). For each sub-block (except for the last sub-block), there are 1024 candidate combinations, out of which 32 candidate combinations deemed most likely survived.

Stage 9 (final stage): use FD block equalizer to detect the entire blocks of symbols, (s(0),s(1), ... , s(299)).). There are 1024 candidate combinations, out of which the most likely candidate is chosen.

Figure 11:
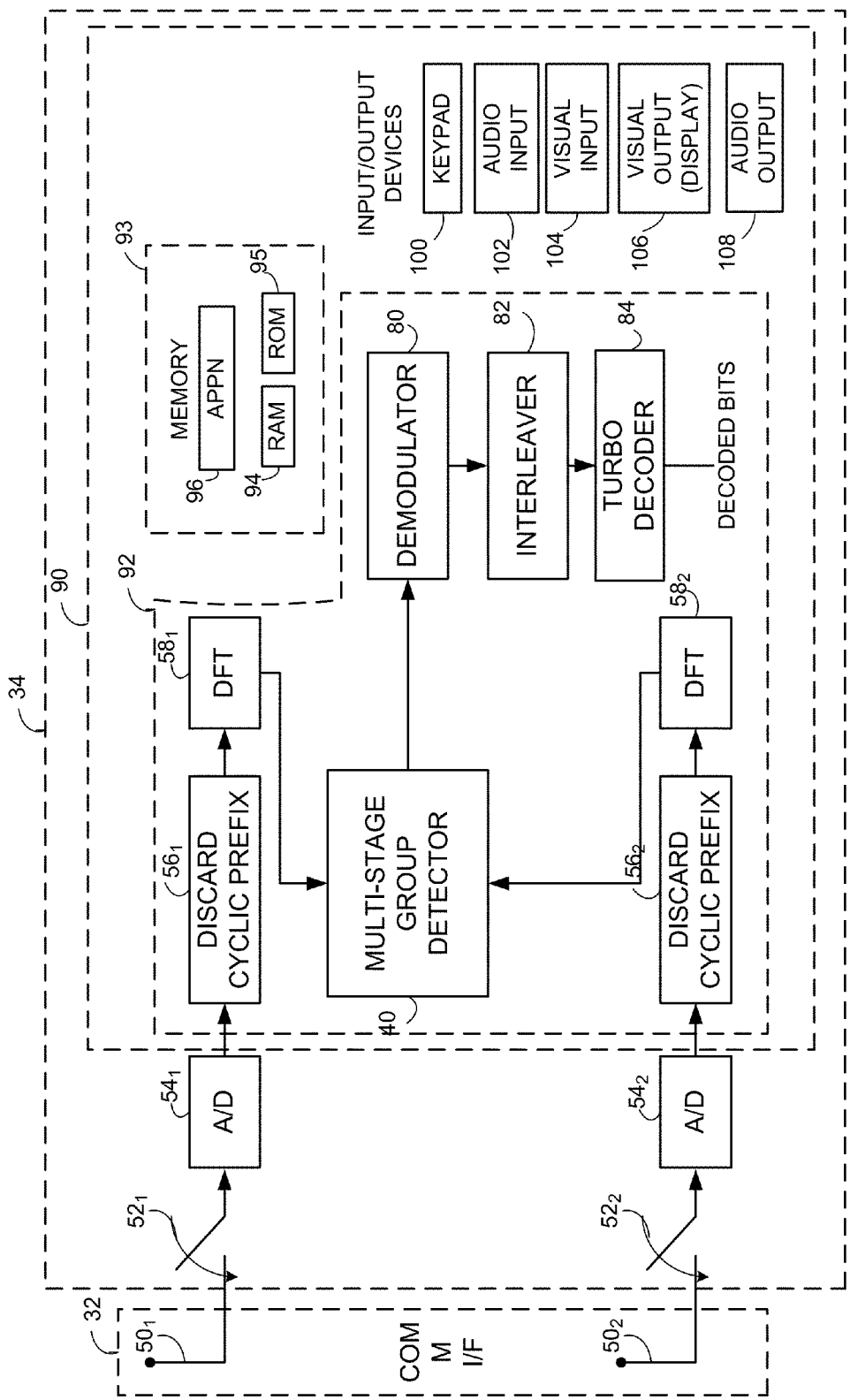
FIG. 11 is a schematic view of selected basic functionalities of a receiver according to an example, machine-implemented embodiment.

FIG. 11 illustrates a non-exhaustive and non-limiting example embodiment of a receiver in which various functional units are provided on a platform 90, the platform 90 being framed by broken lines in FIG. 11. The terminology "platform" is a way of describing how the functional units of receiver 30 can be implemented or realized by machine including electronic circuitry, including the electronic circuitry herein previously described. One example platform 90 is a computer implementation wherein one or more of the framed elements, including multi-stage group symbol detector 40, are realized by one or more processors 92 which execute coded instructions and which use non-transitory signals in order to perform the various acts described herein. In such a computer implementation the receiver 30 can comprise, in addition to a processor(s), memory section 93 (which in turn can comprise random access memory 94; read only memory 95; application memory 96 (which stores, e.g., coded instructions which can be executed by the processor to perform acts described herein); and any other memory such as cache memory, for example.

Typically the platform 90 of receiver 30 also comprises other input/output units or functionalities, some of which are illustrated in FIG. 11, such as keypad 100; audio input device 102 (e.g. microphone); visual input device 104 (e.g., camera); visual output device 106; and audio output device 108 (e.g., speaker). Other types of input/output devices can also be connected to or comprise receiver 30.

In the example of FIG. 11 the platform 90 has been illustrated as computer-implemented or computer-based platforms. Another example platform suitable for base 30 and/or multi-stage group symbol detector 40 in particular is that of a hardware circuit, e.g., an application specific integrated circuit (ASIC) wherein circuit elements are structured and operated to perform the various acts described herein.

Figure 12:
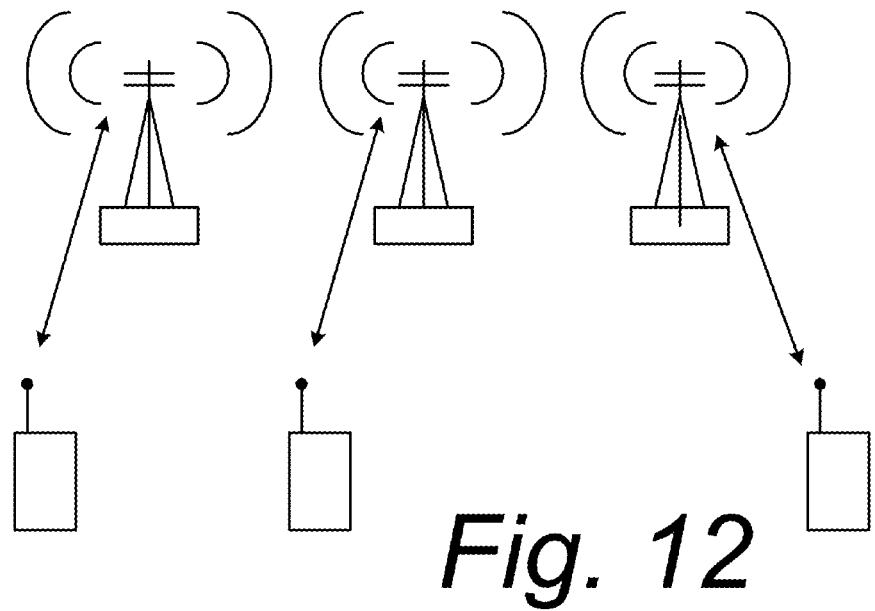
FIG. 12 is a diagrammatic view of portions of a Long Term Evolution (LTE) telecommunications network according to an example embodiment.

Although the described solutions may be implemented in any appropriate type of telecommunication system supporting any suitable communication standards and using any suitable components, particular embodiments of the described solutions may be implemented in a Long Term Evolution (LTE) network, such as that basically illustrated in FIG. 12. As shown in FIG. 12, the example network may include one or more instances of wireless terminals or user equipment (UEs) and one or more base stations capable of communicating with these UEs, along with any additional elements suitable to support communication between UEs or between a UE and another communication device (such as a landline telephone). Although the illustrated UEs may represent communication devices that include any suitable combination of hardware and/or software, these UEs may, in particular embodiments, represent devices such as the example UE illustrated in greater detail by FIG. 13. Similarly, although the illustrated base stations may represent network nodes that include any suitable combination of hardware and/or software, these base stations may, in particular embodiments, represent devices such as the example base station illustrated in greater detail by FIG. 14.

Figure 13:
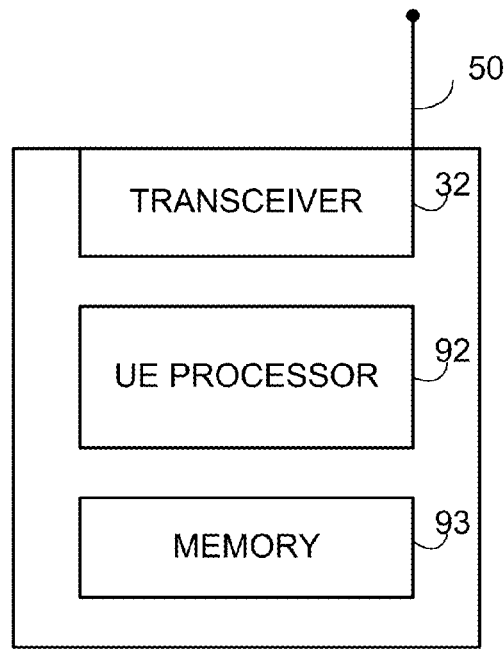
FIG. 13 is a diagrammatic view of portions of a user equipment unit (UE) served by a Long Term Evolution (LTE) telecommunications network according to an example embodiment.

As shown in FIG. 13, the example UE includes a processor 92, a memory 93, a transceiver 32, and an antenna 50. In particular embodiments, some or all of the steps in the uplink transmission techniques described above may be performed by the UE processor executing instructions stored on a computer-readable medium, such as the memory shown in FIG. 13. Alternative embodiments of the UE may include additional components beyond those shown in FIG. 13 that may be responsible for providing certain aspects of the UE's functionality, including any of the functionality described above and/or any functionality necessary to support the solution described above.

Figure 14:
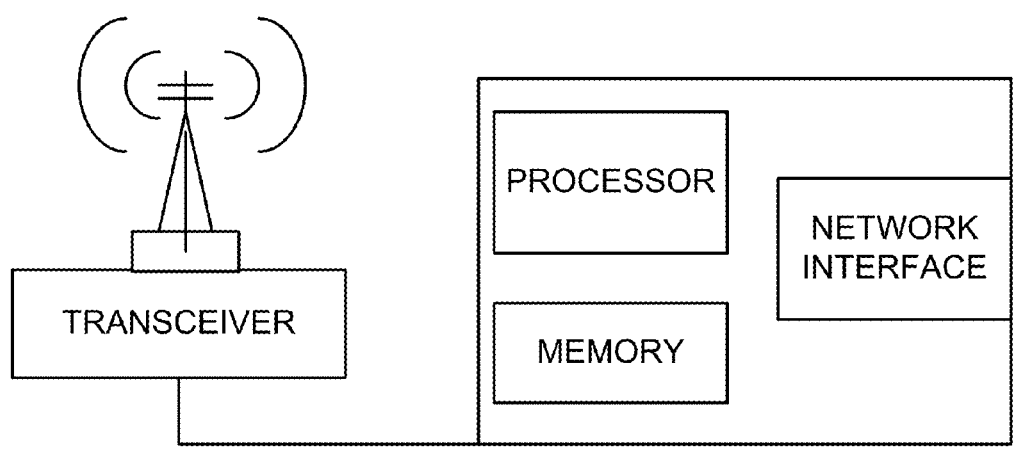
FIG. 14 is a diagrammatic view of portions of a base station node which comprises a Long Term Evolution (LTE) telecommunications network according to an example embodiment.

As shown in FIG. 14, the example base station includes a processor, a memory, a transceiver, and an antenna. In particular embodiments, some or all of the steps in the equalization techniques described above may be performed by the base station processor executing instructions stored on a computer-readable medium, such as the memory shown in FIG. 14. Alternative embodiments of the base station may include additional components responsible for providing additional functionality, including any of the functionality identified above and/or any functionality necessary to support the solution described above.

The technology disclosed herein thus provides a technique of sub-block equalization that can be used to improve uplink LTE or HSPA performance. The disclosed sub-block equalization can be considered as a limited form of maximum likelihood (ML) joint detection in the sense that, with the sub-block equalization technique, symbols within the sub-block of interest are detected jointly whereas symbols outside the sub-block are treated as noise. The sub-block equalization of the technology disclosed herein can also be used in a more complex near-ML detector such as multi-stage group detection (MSGD) (also known as assisted maximum-likelihood detection (AMLD)). Certain existing solutions utilize a form of time-domain (TD) sub-block equalization.

In an example implementation frequency-domain (FD) sub-block equalization is utilized for the Long Term Evolution (LTE) uplink. For example, in example implementations the frequency domain (FD) sub-block equalization as described herein or encompassed hereby can be used on Physical Uplink Shared Channel (PUSCH) or Physical Uplink Control Channel (PUCCH). In example implementations described herein, the sub-block includes a subset of symbols that are jointly DFT-precoded. The sub-block equalization technique of the technology disclosed herein can be used as a building block in a more complex near-ML detector.

Figure 15:
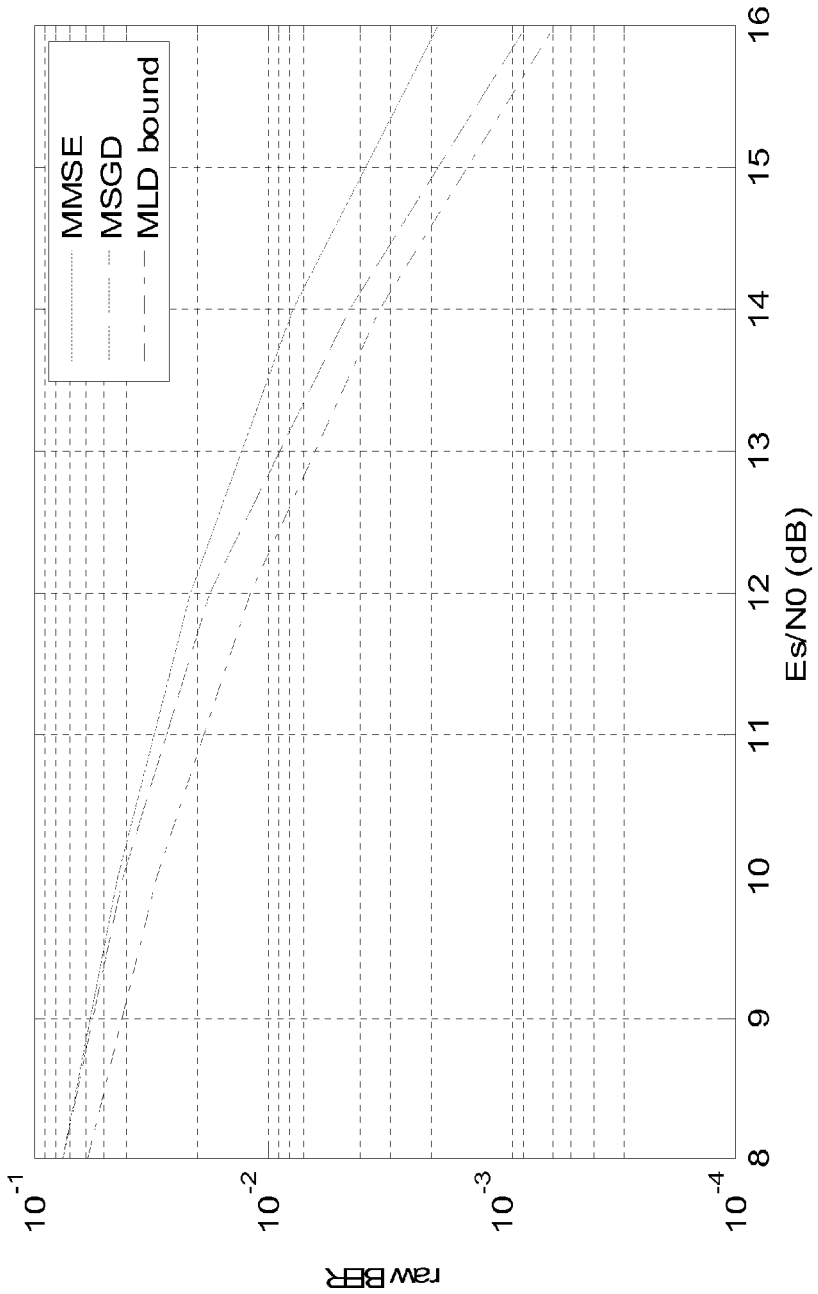
FIG. 15 is a graph showing example performance of an example embodiment of a frequency domain multi-stage group detection (MSGD) receiver.

The performance of a frequency domain multi-stage group detection (MSGD) receiver according to an example embodiment of the technology disclosed herein is shown in FIG. 15. In FIG. 15, minimum mean square error equalization (MMSE) is shown by the top (solid) line; multi-stage group detection (MSGD) is shown by the middle line; and a maximum-likelihood detection (MLD) bound is shown by the bottom line. Compared to the base line (e.g., MMSE frequency domain equalization), multi-stage group detection (MSGD) improves performance significantly at high signal to noise ratios (SNRs). Also, multi-stage group detection (MSGD) has performance close to the theoretical performance bound at high signal to noise ratios (SNRs). At low signal to noise ratios (SNRs), multi-stage group detection (MSGD) performance may be less impressive, mainly due to the parameters used in terms of the numbers of candidate combinations surviving each detection stage. At low S signal to noise ratios (SNRs), more surviving candidates are needed to keep the true ML solution in the early stages.

ABBREVIATIONS

MLD maximum-likelihood detection
SC-FDMA single-carrier frequency-division multiple access
ISI inter-symbol interference
LMMSE linear minimum mean square error equalization
DFE decision-feedback equalization
MSGD multi-stage group detection
AMLD assisted maximum-likelihood detection
ML maximum likelihood
FD frequency-domain
TD time-domain
LE linear equalization
FD-LE frequency-domain linear equalization
PUSCH Physical Uplink Shared Channel
PUCCH Physical Uplink Control Channel Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A receiver comprising:
   a plurality of receive antennas configured to receive, on plural subcarriers transmitted over a radio interface, a frequency domain signal that comprises contribution from a block of time domain symbols; and
   electronic circuitry configured to:
      perform symbol detection of the time domain symbols using a multi-stage joint detection procedure in which the electronic circuitry:
         for a first stage, divides the block into a first number of sub-blocks each having a first sub-block size;
         for a second stage, divides the block into a second number of sub-blocks each having a second sub-block size, the second sub-block size being greater than the first sub-block size;
         for each stage, formulates frequency domain combining weights and uses the frequency domain combining weights for combining multiple received versions of each subcarrier to provide candidate symbol combination values for symbols in each sub-block of the respective stage, the frequency domain combining weights of each stage being dependent on the sub-block size of the respective stage and thus differing from stage to stage, the multiple received versions of each subcarrier being received over a different receive antenna; and
         for the second stage, using the candidate symbol combination values of the first stage to formulate joint hypotheses to serve as candidates for the joint detection operation of the second stage.

2. The receiver of claim 1, wherein electronic circuitry is further configured to jointly detect the number of symbols comprising the sub-block for each of the first stage and the second stage and for each sub-block of each stage to evaluate plural detection metrics that are appropriate for the respective stage.

3. The receiver of claim 1, wherein the electronic circuitry is further configured:
   for each stage, to divide the block into one or more sub-blocks so that, with increasing stage, a number of sub-blocks decreases and the sub-block size increases until a last stage in which a last stage sub-block includes all the symbols of the block;
   for each stage and for each sub-block separately within the stage, to jointly detect the symbols comprising the sub-block on the basis of candidates for each symbol or symbol combination from a previous stage and thereby provide the candidate symbol combination values for the use in the stage;
   at the end of each stage excepting the last stage, to retain the most likely candidate symbol combination values as the candidates for a next stage;
   to output best symbol values of the last stage as jointly detected symbol values of the block.

4. The receiver of claim 3, wherein the electronic circuitry is further configured:
   in performing a first stage:
      to divide the block into sub-blocks comprising P number of symbols;
      for each sub-block separately, to jointly detect the P number of symbols comprising the sub-block on the basis of candidates for each symbol; and,
      to retain the most likely candidate symbol combination values as the candidates for the next stage;
   in performing a second stage:
      to divide the block into sub-blocks comprising 2P number of symbols;
      for each sub-block separately, to jointly detect the 2P number of symbols comprising the sub-block on the basis of candidates retained from the first stage; and
      to retain the most likely candidate symbol combination values as the candidates for the next stage;
   in performing an $m^{th}$ stage:
      to divide the block into sub-blocks comprising $2^{m-1}P$ number of symbols;
      for each sub-block separately, to jointly detect the $2^{m-1}P$ number of symbols comprising the sub-block on the basis of candidates retained from stage m−1; and
      to retain the most likely candidate symbol combination values as the candidates for the next stage;

in performing a final stage:
to jointly detect all the symbols of the block on the basis of candidate symbol combination values retained from a next-to-last stage; and
to output the best symbol values of the last stage as the jointly detected symbol values of the block.

5. The receiver of claim 1, wherein the electronic circuitry is further configured in performing each stage to jointly detect the symbols of the sub-block while treating symbols of the block that are outside of the sub-block as noise.

6. The receiver of claim 1, wherein the electronic circuitry is further configured, in performing each stage, to use properties related to symbols of the block that are outside of the sub-block for generating the frequency domain combining weights.

7. The receiver of claim 6, wherein the properties related to the symbols of the block that are outside of the sub-block comprises frequency characteristics and spatial correlation of the symbols of the block that are outside of the sub-block.

8. The receiver of claim 7, wherein all the subblocks share same combining weights for combining multiple received versions of each subcarrier, each receive version being received over a receive antenna.

9. The receiver of claim 1, wherein the electronic circuitry is further configured, in performing a preliminary stage before the first stage:
to divide the block into sub-blocks each comprising one symbol;
for each sub-block separately, to detect the symbol of the sub-block using candidates; and,
to retain the most likely candidate symbol combination values as the candidates for the first stage.

10. The receiver of claim 9, wherein the electronic circuitry is further configured to use linear minimum mean square error equalization to detect the symbol of the sub-blocks of the preliminary stage.

11. The receiver of claim 1, wherein the electronic circuitry is further configured, for any stage b wherein the block does not have sufficient number of symbols to fill an incomplete sub-block, to fill in the incomplete sub-block with dummy symbols having one constellation point of value zero so that the incomplete sub-block becomes complete with $P^b$ number of symbols.

12. The receiver of claim 1, wherein the receiver is a base station and wherein the plural receive antennas are configured to receive the frequency domain signal on an uplink channel.

13. The receiver of claim 12, wherein the uplink channel is at least one of a Physical Uplink Shared Channel (PUSCH) and a Physical Uplink Control Channel (PUCCH).

14. A method of operating a receiver which receives, on plural subcarriers transmitted over a radio interface, a frequency domain received signal that comprises contribution from a block of time domain symbols, the method comprising:
performing symbol detection of the time domain symbols using a multi-stage joint detection procedure comprising:
for a first stage, dividing the block into a first number of sub-blocks each having a first sub-block size;
for a second stage, dividing the block into a second number of sub-blocks each having a second sub-block size, the second sub-block size being greater than the first sub-block size;
for each stage, formulating frequency domain combining weights and using the frequency domain combining weights for combining multiple received versions of each subcarrier to provide candidate symbol combination values for symbols in each sub-block of the respective stage, the frequency domain combining weights of each stage being dependent on the sub-block size of the respective stage and thus differing from stage to stage, the multiple received versions of each subcarrier being received over a different receive antenna; and
for the second stage, using the candidate symbol combination values of the first stage to formulate joint hypotheses to serve as candidates for the joint detection operation of the second stage.

15. The method of claim 14, further comprising jointly detecting the number of symbols comprising the sub-block for each of the first stage and the second stage and for each sub-block of each stage to evaluate plural detection metrics that are appropriate for the respective stage.

16. The method of claim 14, further comprising:
for each stage, dividing the block into one or more sub-blocks so that, with increasing stage, a number of sub-blocks decreases and the sub-block size increases until a last stage in which a last stage sub-block includes all the symbols of the block;
for each stage and for each sub-block separately within the stage, jointly detecting the symbols comprising the sub-block on the basis of candidates for each symbol or symbol combination from a previous stage and thereby providing the candidate symbol combination values for the use in the stage;
at the end of each stage excepting the last stage, retaining the most likely candidate symbol combination values as the candidates for a next stage;
outputting best symbol values of the last stage as jointly detected symbol values of the block.

17. The method of claim 16, further comprising:
in performing a first stage:
dividing the block into sub-blocks comprising P number of symbols;
for each sub-block separately, jointly detecting the P number of symbols comprising the sub-block on the basis of candidates for each symbol; and,
retaining the most likely candidate symbol combination values as the candidates for the next stage;
in performing a second stage:
dividing the block into sub-blocks comprising 2P number of symbols;
for each sub-block separately, jointly detecting the 2P number of symbols comprising the sub-block on the basis of candidates retained from the first stage; and
retaining the most likely candidate symbol combination values as the candidates for the next stage;
in performing an $m^{th}$ stage:
dividing the block into sub-blocks comprising $2^{m-1}P$ number of symbols;
for each sub-block separately, jointly detecting the $2^{m-1}P$ number of symbols comprising the sub-block on the basis of candidates retained from stage m−1; and
retaining the most likely candidate symbol combination values as the candidates for the next stage;
in performing a final stage:
jointly detecting all the symbols of the block on the basis of candidate symbol combination values retained from a next-to-last stage; and
outputting the best symbol values of the last stage as the jointly detected symbol values of the block.

18. The method of claim 14, further comprising, in performing each stage, jointly detecting the symbols of the sub-block while treating symbols of the block that are outside of the sub-block as noise.

19. The method of claim 14, further comprising, in performing each stage using properties related to symbols of the block that are outside of the sub-block for generating the frequency domain combining weights.

20. The method of claim 19, wherein the properties related to the symbols of the block that are outside of the sub-block comprises frequency characteristics and spatial correlation of the symbols of the block that are outside of the sub-block.

21. The method of claim 20, wherein all the sub-blocks share same combining weights for combining multiple receive versions of each subcarrier, each receive version being received over a receive antenna.

22. The method of claim 14, further comprising, in performing a preliminary stage before the first stage:
dividing the block into sub-blocks each comprising one symbol;
for each sub-block separately, detecting the symbol of the sub-block using candidates; and,
retaining the most likely candidate symbol combination values as the candidates for the first stage.

23. The method of claim 22, further comprising using linear minimum mean square error equalization to detect the symbol of the sub-blocks of the preliminary stage.

24. The method of claim 14, further comprising, for any stage b wherein the block does not have sufficient number of symbols to fill an incomplete sub-block, filling in the incomplete sub-block with dummy symbols having one constellation point of value zero so that the incomplete sub-block becomes complete with $P^b$ number of symbols.

25. The method of claim 14, wherein acts of the method are performed at a base station comprising plural receive antennas and configured to receive the block on an uplink channel.

26. The method of claim 25, wherein the uplink channel is at least one of a Physical Uplink Shared Channel (PUSCH) and a Physical Uplink Control Channel (PUCCH).

* * * * *